United States Patent [19]

Meri et al.

[11] 4,188,507
[45] Feb. 12, 1980

[54] REMOTELY CONTROLLED TELEPHONE ANSWERING APPARATUS

[75] Inventors: Kalju Meri, Maspeth; Richard G. Allen, Pound Ridge, both of N.Y.

[73] Assignee: Dictaphone Corporation, Rye, N.Y.

[21] Appl. No.: 823,444

[22] Filed: Aug. 10, 1977

[51] Int. Cl.² .......................... H04M 1/64; H04M 3/42
[52] U.S. Cl. ..................................... 179/6 D; 179/6 E
[58] Field of Search ............... 179/6 C, 6 D, 6 E, 6 R

[56] References Cited

U.S. PATENT DOCUMENTS

| | | | |
|---|---|---|---|
| 3,510,598 | 5/1970 | Ballin et al. | 179/6 D |
| 3,684,834 | 8/1972 | Bryant, Jr. | 179/6 C |
| 3,728,486 | 4/1973 | Kraus | 179/6 C |
| 3,885,108 | 5/1975 | Zock | 179/90 B |
| 3,904,826 | 9/1975 | Murata et al. | 179/6 E |
| 3,925,622 | 12/1975 | Robinson | 179/6 D |
| 3,943,289 | 3/1976 | Sheldon et al. | 179/6 D |
| 3,974,338 | 8/1976 | Luzier et al. | 179/6 C |
| 4,007,333 | 2/1977 | Marheine | 179/6 D |
| 4,052,570 | 10/1977 | Sutton | 179/90 B |
| 4,065,642 | 12/1977 | McClure | 179/6 R |
| 4,072,824 | 2/1978 | Phillips | 179/18 B |

Primary Examiner—Bernard Konick
Assistant Examiner—Donald E. McElheny, Jr.
Attorney, Agent, or Firm—Arthur V. Smith; William S. Frommer

[57] ABSTRACT

Telephone answering apparatus adapted to be coupled to a telephone line and having a first storage medium, such as a first magnetic tape, for storing announcement information and remote telephone number information, and a second storage medium, such as a second magnetic tape, upon which are recorded messages which are received via the telephone line. In response to an incoming telephone call, the first tape is driven so as to transmit the prerecorded announcement, and at the conclusion of this announcement the first tape is stopped and the second tape is driven so as to record an incoming message. A timing circuit is actuated for the duration of the incoming message so as to determine whether it exceeds a minimum duration. At the conclusion of the incoming message, a calling circuit is actuated to resume driving the first tape so that the remote telephone number information is transmitted, thereby dialing a remote telephone station. If a user of the machine is located at the remote telephone station, he can transmit a coded signal which is detected by a code detector at the telephone answering apparatus so as to cause the messages previously recorded on the second tape to be played back. In the event that the recorded messages are not played back, for example, if the dialed remote telephone is not answered or if the coded signal is not transmitted, a repeat circuit re-energizes the calling circuit a preset number of times, or until such recorded messages are played back. In another embodiment of this apparatus, the announcement and remote telephone number information which are recorded on the first tape can be revised from any remote telephone station. In a still further embodiment, the first tape also may be provided with a page message which is adapted to be transmitted to an automatic paging installation associated with the remote telephone number. In accordance with this page message, a user of the apparatus, who also is a subscriber to the paging installation, will be apprised that a telephone message had been recorded on his telephone answering apparatus and is awaiting retrieval.

28 Claims, 7 Drawing Figures

FIG. 2A

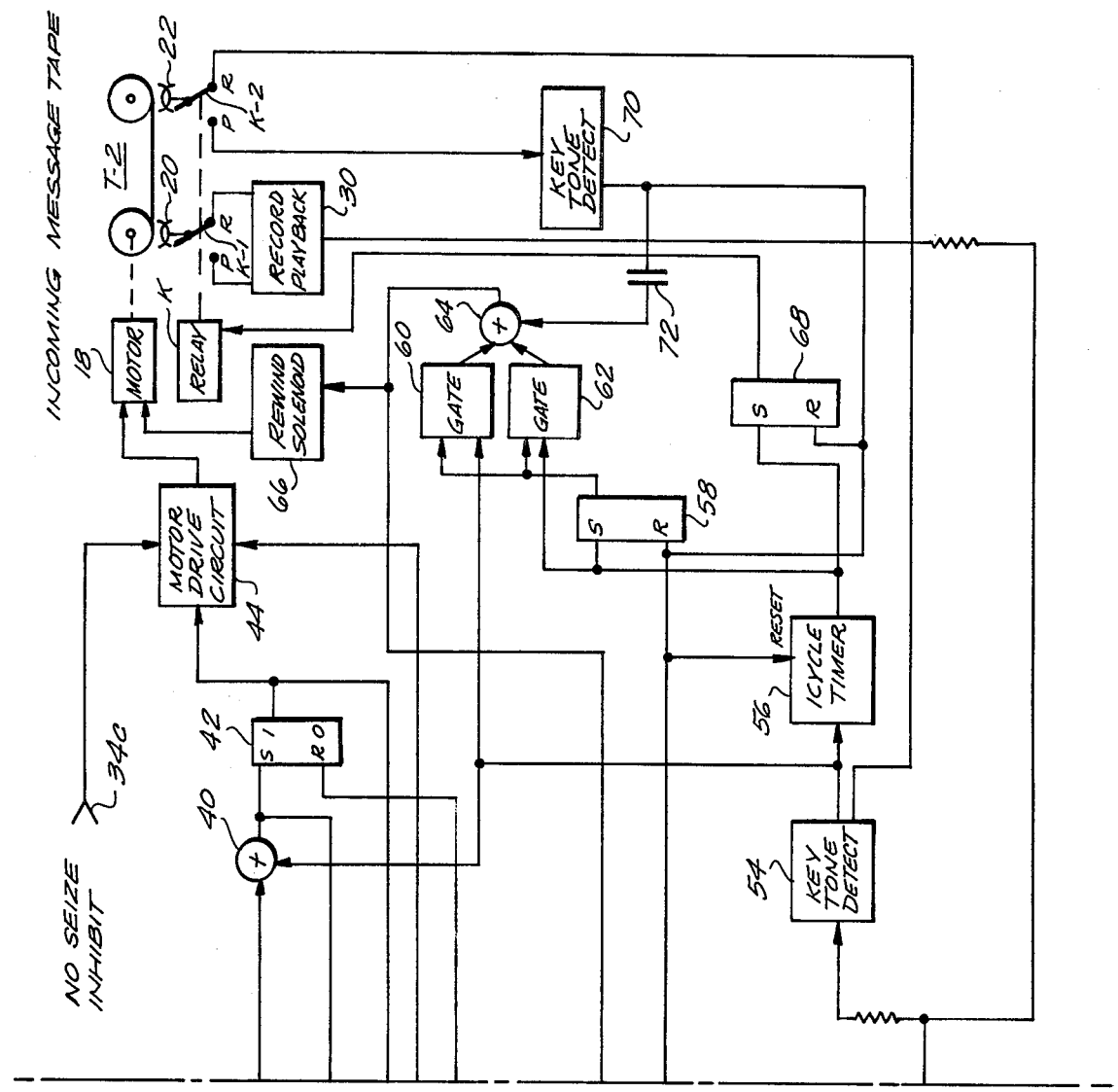

FIG. 3A

FIG. 4
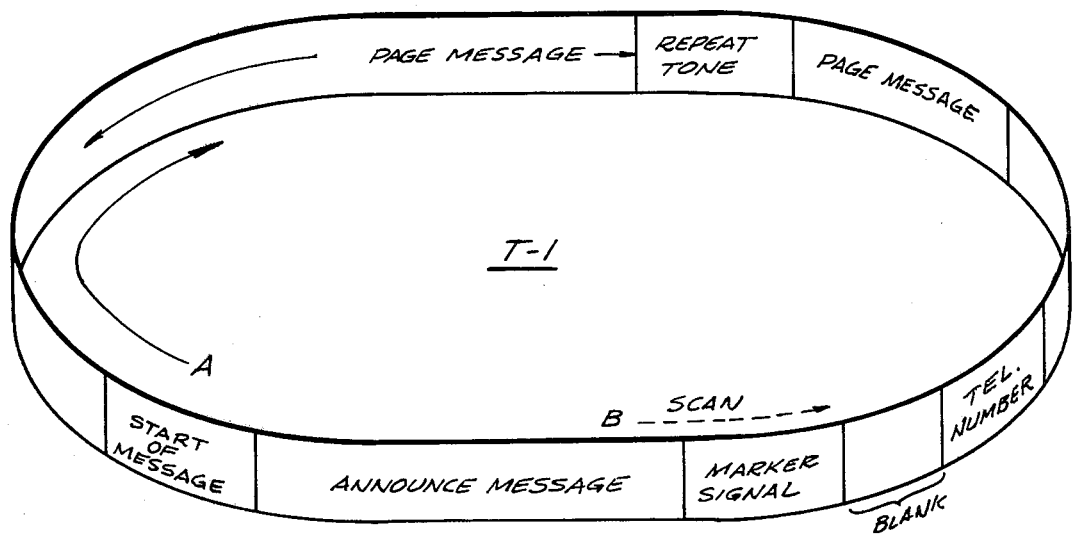
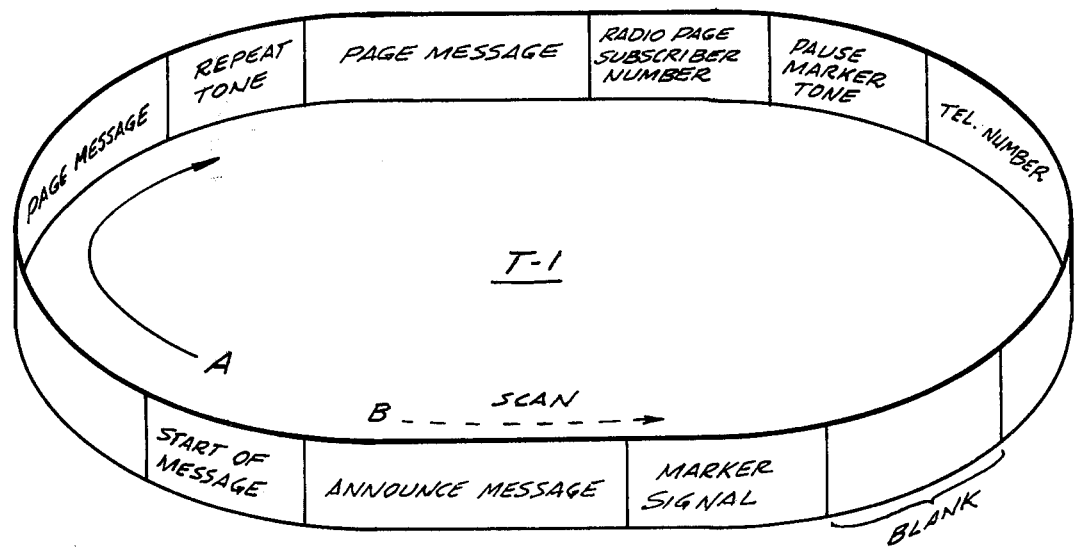
FIG. 5

REMOTELY CONTROLLED TELEPHONE ANSWERING APPARATUS

BACKGROUND OF THE INVENTION

This invention relates to telephone answering apparatus and, more particularly, to remotely controlled telephone answering apparatus which is capable of recording incoming telephone messages and then notifying a user of this apparatus that such a message has been recorded and should be retrieved.

The use of automated telephone answering equipment has become advantageous to many organizations and businesses. Such equipment enables one to receive important telephone messages even though he may not be present at his telephone station. However, until recently, messages which had been recorded on a user's equipment could not be retrieved, i.e., played back, until the user returned to the site of such equipment.

Recently, remotely-controlled telephone answering apparatus has been introduced which offers the feature of permitting a user to operate his apparatus so as to retrieve previously recorded messages from virtually any telephone station. One example of such remotely-controlled telephone answering apparatus is sold by Dictaphone Corporation under the trademark "Ansafone", Model 690. A user is provided with a portable, battery-powered key tone generator which is adapted to generate a particular tone signal capable of selectively operating the telephone answering device so that previously recorded messages can be retrieved. This device includes a magnetic announcement tape upon which the user records a desired announcement so as to inform a caller that the user is not available to communicate directly and that the caller should recored a message if he so wishes. A magnetic message tape then is activated and suitable recording electronics which are coupled to the telephone line will record whatever message the caller transmits. After this message has been completed, the telephone answering device automatically is disconnected from the telephone line and is reset in preparation of the next incoming telephone call. The user can retrieve previously recorded messages merely by calling the telephone station at which his device is located and then activating his key tone generator so as to transmit the particular tone to his device via the telephone line. Upon receipt of this tone, control circuitry is actuated to rewind the message tape and then to drive that tape in a normal, playback direction so that the messages which has been recorded on the rewound portion are transmitted over the telephone line to the user. At the completion of a message review operation, the telephone answering device automatically is reset in preparation of the next incoming telephone call.

While remotely controllable telephone answering apparatus of the type described hereinabove generally is advantageous, most such devices do not initiate a message retrieval operation on their own. That is, previously recorded messages are not retrieved until the user directs an incoming telephone call to the device. Consequently, the user will not be apprised of, for example, an urgent message which should be retrieved immediately and acted upon promptly. Also, if relatively few incoming messages are received, a user, not being apprised of the reception of such messages, may call his device many times, only to retrieve the very same messages as before, without detecting new messages. Still further, since the user must initiate a message retrieval operation by calling his device, situations may arise where it is undesirable to initiate numerous telephone toll calls from remote telephone stations.

The foregoing disadvantages generally can be overcome if the telephone answering device is provided with suitable control circuitry whereby a predetermined remote telephone station is called automatically by the device after each incoming message is recorded. This would apprise the user of each new message without requiring him to call his device. Hence, urgent messages could be retrieved immediately. Also, telephone tolls which are registered during a retrieval operation will be charged to the user's telephone station.

If a telephone answering device is provided with the aforenoted capability to call a remote telephone station whereat the user is expected to be located, various factors may prevent that telephone call from being answered promptly. Therefore, it may be desirable to initiate repeated telephone calls to that remote station until the user has an opportunity to answer and to retrieve the recorded messages. However, it may be useful to limit the number of such repeated telephone calls that are initiated. For example, if the telephone call is made to an erroneous station, there should be a limit as to the number of such calls that are initiated.

If a telephone answering device is provided with the capability of initiating a telephone call to a predetermined remote station, it is assumed that the user will be located at that station in order to receive the call and retrieve recorded messages. If the user changes his location, the telephone answering device must be controlled, or "reprogrammed," to initiate a telephone call to the user's new location. Accordingly, it is desirable to enable a user to reprogram his device from any remote telephone station so that the device will call the proper remote station after an incoming message is recorded.

In some instances, a user may change locations so frequently that it would be impractical for him to reprogram his device with each change. However, if the user subscribes to a radio paging service, it would be desirable for his telephone answering device to communicate with the paging service so that the service, in turn, will apprise the user to call his device and thereby retrieve the recorded messages.

OBJECTS OF THE INVENTION

Therefore, it is an object of the present invention to provide an improved, remotely controlled telephone answering apparatus.

It is another object of this invention to provide a telephone answering apparatus wherein an incoming message is recorded and then, at the completion of such message, a remote telephone station automatically is dialed in order to apprise the user of the apparatus of the presence of a recorded message.

A further object of this invention is to provide a remotely controlled telephone answering apparatus wherein a predetermined remote telephone station is dialed following the reception of an incoming message only if that message exhbits a minimum duration.

An additional object of this invention is to provide a remotely controlled telephone answering apparatus wherein a predetermined remote telephone station is dialed following the recording of an incoming message so as to enable a user of the apparatus who is located at that remote telephone station to retrieve the recorded message, and to initiate repeated telephone calls to that remote station in the event that the recorded message is not retrieved.

Yet another object of the invention is to provide a remotely controlled telephone answering apparatus wherein a predetermined remote telephone number is dialed automatically after an incoming message is recorded, such dialing operation being repeated a programmable number of times in the event that the recorded message is not retrieved.

A still further object of the present invention is to provide telephone answering apparatus capable of automatically dialing a remote telephone number following the recording of an incoming message, wherein the apparatus can be reprogrammed from a remote telephone station so as to dial any desired telephone number.

Another object of this invention is to provide telephone answering apparatus having a magnetic announcement tape upon which announcement messages can be recorded and revised by a user of the apparatus from any remote telephone station.

Another object of this invention is to provide remotely controlled telephone answering apparatus which is capable of initiating a telephone call to a radio paging service following the recording of an incoming message and to notify that service to apprise a subscriber thereof of the presence of a recorded message which is awaiting retrieval.

Various other objects, advantages and features of the present invention will become readily apparent from the ensuing detailed description, and the novel features will be particularly pointed out in the appended claims.

SUMMARY OF THE INVENTION

In accordance with the present invention, telephone answering apparatus is provided having an announcement message storage medium, such as a magnetic announcement tape, upon which announcement messages are recorded, and an incoming message storage medium, such as a magnetic tape, upon which incoming messages are recorded, the announcement message tape being energized in response to an incoming telephone call and the incoming message tape being energized to record a caller's message. A calling circuit is provided to sense the completion of an incoming message and then to dial a predetermined remote telephone number so as to apprise a user located at the telephone station associated with the dialed number that an incoming message had been recorded and should be retrieved. A repeat circuit is provided to sense whether the recorded incoming message had been retrieved, and to initiate a predetermined number of repeated dialing operations in the event that such message had not been retrieved. In a preferred embodiment, a record control circuit is provided to enable a user of the apparatus to reprogram his announcement message as well as the remote telephone number which is dialed following the recording of an incoming message. The record control circuit includes coded signal detectors to prevent inadvertent and unwanted reprogramming. In another embodiment of this apparatus, paging control circuitry is provided to enable the telephone answering apparatus to call a radio paging installation and to communicate therewith such that a subscriber to the radio paging service is notified that a message had been recorded and is awaiting retrieval from the telephone answering apparatus.

BRIEF DESCRIPTION OF THE DRAWINGS

The following detailed description, given by way of example, will best be understood in conjunction with the accompanying drawings in which:

FIGS. 2A and 2B, in combination, are a block diagram of a retrievable-message type of telephone answering apparatus with which the present invention can be used;

FIGS. 3A and 3B, in combination, are a schematic diagram of a preferred embodiment of the present invention;

FIG. 4 is a representation of the information which is recorded in the announcement message storage medium used with the present invention; and FIG. 5 is another representation of the announcement information which is recorded in the announcement message storage medium used with the present invention.

DETAILED DESCRIPTION OF A PREFERRED EMBODIMENT

Figure 1:
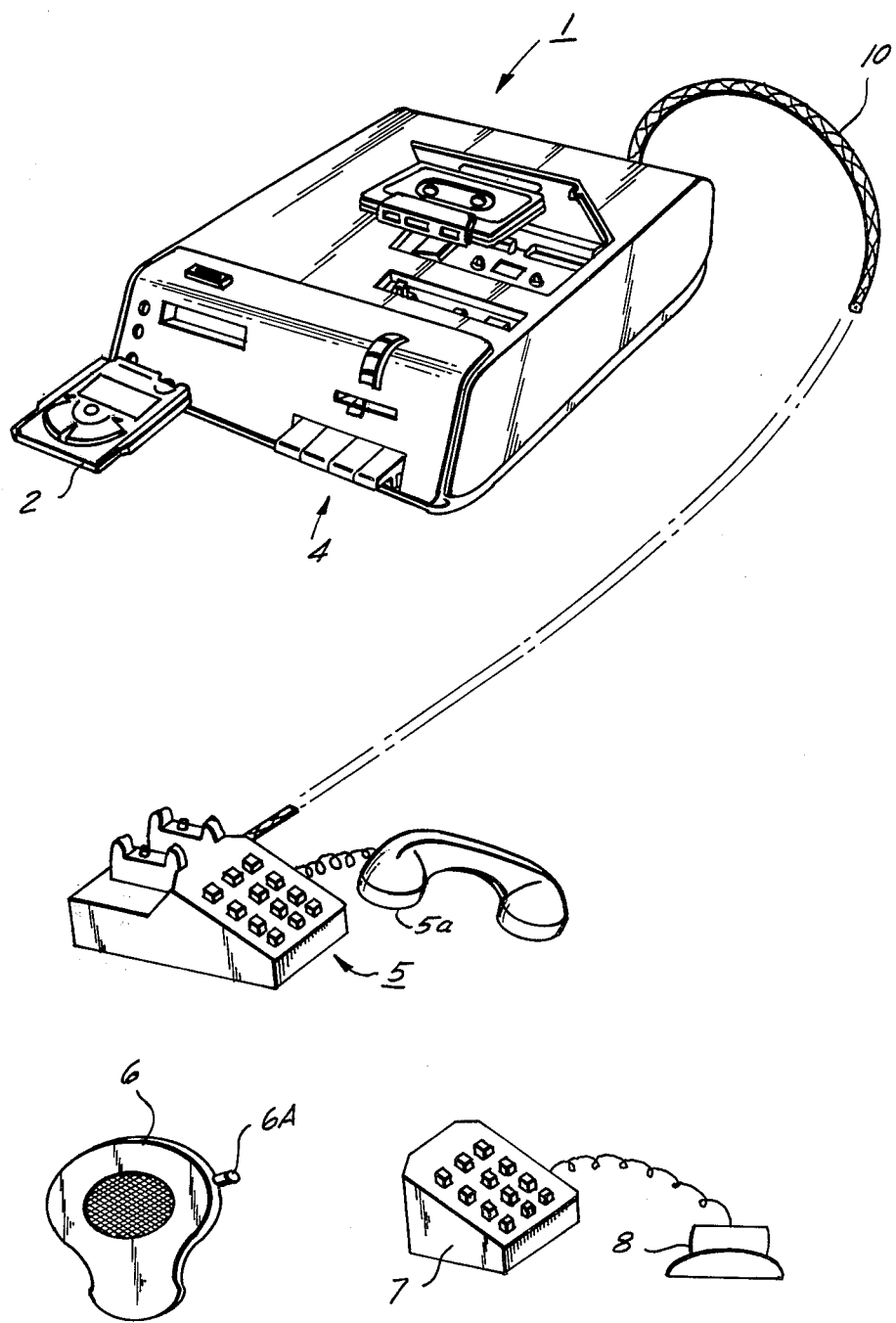
FIG. 1 is a representational view of telephone answering apparatus with which the present invention can be used and also indicates the manner in which such apparatus can be controlled.

Referring now to the drawings, and in particular to FIG. 1, a remotely controlled telephone answering device 1 is shown wherein the features of the present invention can be used. As one example thereof, device 1 may be similar to the aforementioned "Ansafone" machine sold by Dictaphone Corporation. Device 1 is provided with a magnetic announcement message tape 2 upon which a user of the device records a desired announcement message. The device also is provided with a magnetic incoming message tape 3 upon which incoming messages which are received via a telephone line 10 to which device 1 is coupled are recorded. Also provided with device 1 are suitable control switches 4 which can be used, for example, to selectively control the device such that incoming messages which are recorded on tape 3 can be reviewed, and so that the announcement message which is recorded on tape 2 also can be reviewed. Also to this effect, switches 4 may include a rewind switch, a forward switch, a playback switch, a stop switch and an actuating switch whereby device 1 is conditioned for automatic operation. The device also may include various other control switches and knobs, which form no part of the present invention per se.

Figure 2A:
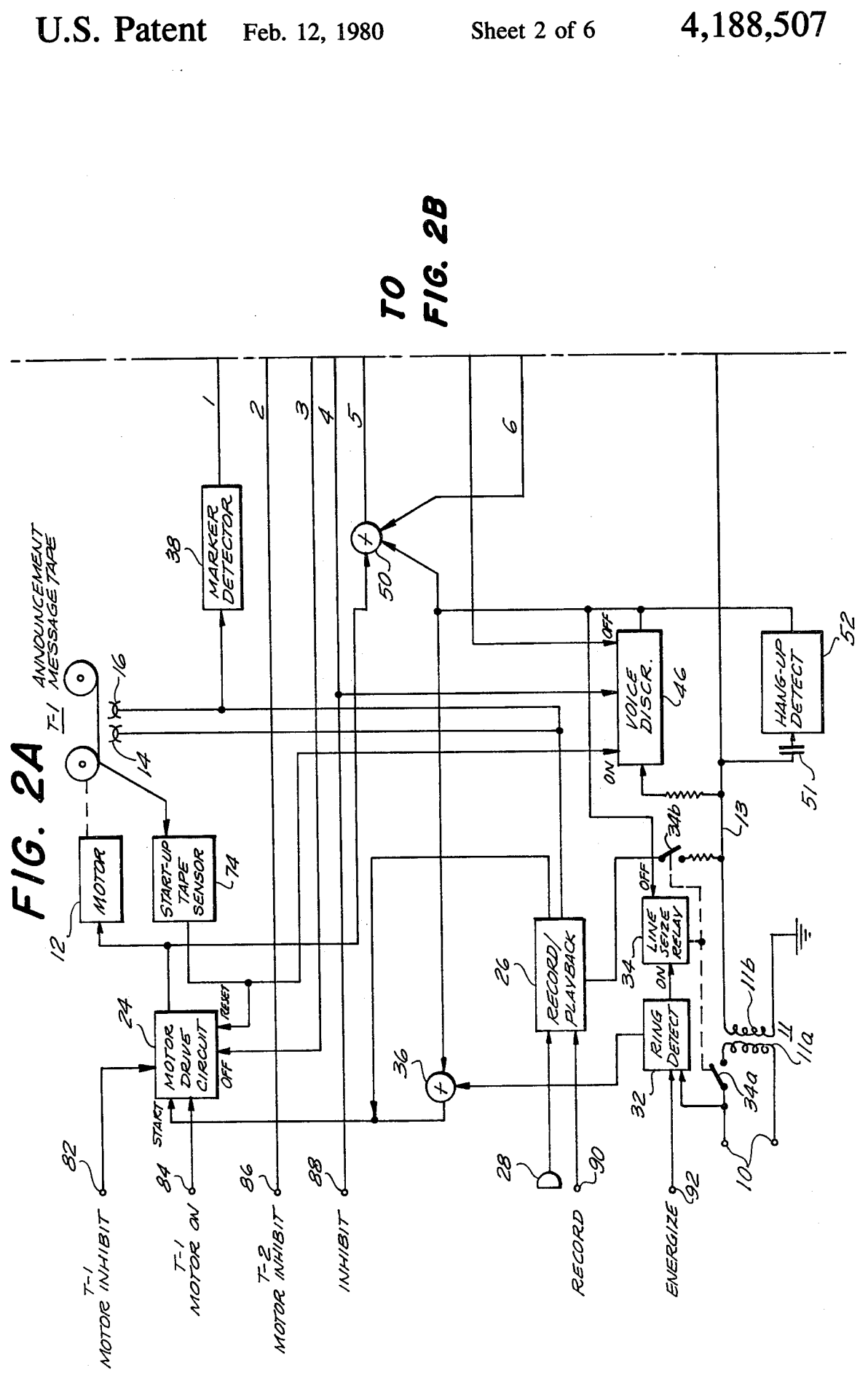

As will be described in greater detail hereinbelow with respect to FIGS. 2A and 2B, a portable, battery-powered tone generator 6 is selectively operable, such as by actuating a switch 6a, to generate an audible tone, which tone, when received by device 1, controls that device to rewind message tape 3 and then to play back those messages which had been recorded on the rewound portion of the tape.

When telephone answering device 1 is prepared for operation, a user thereof connects a microphone (not shown) thereto so as to record a desired announcement message upon tape 2. Preferably, a start-of-message indication is provided on the tape, and an end-of-message indication is recorded at the conclusion of the announcement message. After verifying his announcement message, as by selectively actuating suitable ones of switches 4, the user conditions device 1 for a telephone answering operation. Accordingly, whenever an incoming telephone call is received, device 1 is actuated to seize telephone line 10, and announcement tape drive mechanism is actuated such that the recorded announcement message is played back from tape 2 and transmitted over telephone line 10 to the caller. Assuming that the announcement message includes suitable instructions to the caller, he will transmit an incoming message via telephone line 10 to device 1 following the completion of the announcement message. This incoming message is recorded on tape 3; and at the conclusion of the incoming message, the incoming message tape drive mechanism is de-energized and device 1 releases the telephone line. Then, the announcement message tape drive mechanism is re-energized so as to cycle tape 2 (which, preferably is an endless tape loop) to return to the start-of-message indication. The device now is ready for reuse in response to the next incoming telephone call.

If the user of the machine is, for example, located at telephone station 5, he can dial the telephone number associated with device 1 in order to retrieve the messages which had been recorded on tape 3 during his absence. As before, device 1 will seize telephone line 10 in response to the incoming call initiated by the user from remote station 5. Hence, the announcement message tape drive mechanism will be energized to drive tape 2 so as to play back the previously recorded announcement message. At substantially any time following the seizure of telephone line 10 by device 1, the user at remote station 5 may actuate tone generator 6 so as to transmit the predetermined tone signal to microphone pick-up 5a of the handset associated wtih telephone station 5 such that this tone is transmitted to device 1. Upon receipt of this particular tone frequency, the announcement message tape drive mechanism will be de-energized and the incoming message tape drive mechanism will be energized so as to rewind tape 3. Immediately following this rewind operation, which may subsist for a predetermined duration, the incoming message tape drive mechanism is actuated so as to play back the messages which had been recorded on the rewound portion of tape 3. At the conclusion of this playback operation, the user at remote station 5 may return the handset to its on-hook condition, resulting in the release of telephone line 10 by device 1. The device then will perform a reset operation, as before, so as to be ready to receive the next incoming telephone call.

When the various features of the present invention, described below, are incorporated into device 1, the device can be operated from, for example, remote telephone station 5 so as to perform certain desired operations. For example, additional predetermined tone signals can be transmitted to device 1 such that the announcement message tape recording circuitry is activated to enable a new announcement message to be recorded on tape 2 from the remote station. Conveniently, such additional tone signals may be derived from a conventional dual-tone multifrequency dialing mechanism, such as the Touch Tone dialing mechanism of American Telephone and Telegraph Co. In the event that remote telephone station 5 is not provided with a Touch Tone dialing mechanism, a separate, conventional tone generator, such as a tone pad 7 can be used to generate such tone frequencies, these frequencies being transmitted via an acoustic coupler 8 to microphone 5a, and thence over telephone line 10. Hence, announcement message tape 2 can be reprogrammed from virtually any telephone station.

MESSAGE-RETRIEVABLE TELEPHONE ANSWERING DEVICE

Before proceeding with a description of the various features of the present invention, it will be helpful to describe the construction of a typical remotely controlled message-retrievable telephone answering device which can be used therewith. A block diagram of such a device is shown in FIGS. 2A and 2B and includes an announcement message tape, hereinafter referred to as tape T-1, and an incoming message tape, hereinafter referred to as tape T-2. As before, it will be assumed that tape T-1 is arranged in an endless loop and is driven by a motor 12 coupled to suitable tape drive linkages. Tape T-1 may include two recording tracks magnetically coupled to transducers 14 and 16, these transducers comprising typical record/playback heads. A selectively energizable motor 18 is provided to drive tape T-2 past transducers 20 and 22, these transducers being magnetically coupled to separate recording tracks on tape T-2 and comprising conventional record/playback heads. Motor 18 is adapted to bidirectionally drive tape T-2 and, to this effect, may comprise a bidirectional motor or, alternatively, may be a unidirectional motor which is coupled through a selectively energizable forward/rewind linkage to the tape.

A motor drive circuit 24 is coupled to T-1 motor 12 and is adapted to selectively energize that motor in response to various control signals applied to the motor drive circuit. These control signals are diagrammatically represented as a START signal for energizing the motor drive circuit, an OFF signal for de-energizing the motor drive circuit and a RESET signal for restoring the motor drive circuit to a standby condition. A record/playback circuit 26 is coupled to motor drive circuit 24 and, when actuated, is adapted to supply a START signal thereto. It is recalled that announcement messages recorded on tape T-1 are derived from a microphone. Accordingly, microphone 28 is coupled to record/playback circuit 26 so as to selectively actuate this circuit to effect the recording of announcement messages. An audio output terminal of record/playback circuit 26 is coupled to heads 14 and 16 such that suitable audio signals are recorded on the respective tracks of tape T-1 by these heads. In one embodiment thereof, microphone 28 may be of the push-to-record type having a pushbutton switch which must be actuated in order to actuate record/playback circuit 26. Upon de-actuation of this switch, the record/playback circuit also is deactuated and a suitable marker tone is generated and supplied to both heads 14 and 16. The use of this recorded marker tone on the track associated with head 16 will be described in greater detail.

The START signal which is applied to motor drive circuit 24, in addition to being produced by record/playback circuit 26, also is derived from a ring detector circuit 32. This ring detector circuit is coupled to telephone line 10, and is adpated to detect a ringing signal supplied to the telephone line and to produce the START signal in response thereto. Ring detector circuit 32 also is coupled to a line seize relay 34 so as to energize this relay in response to a detected ringing signal. Upon energization, line seize relay 34 closes its relay contact 34a which couples telephone line 10 to a transformer 11, thereby seizing the telephone line and coupling buss 13 thereto through secondary winding 11b and primary winding 11a. Line seize relay 34 also includes an additional relay contact 34b which is adapted to connect record/playback circuit 26 to buss 13 via a mixing resistor, as shown. For simplification, the output of ring detector circuit 32 is shown as being coupled through a mixing circuit 36, such as mixing resistors, which functions as an analog OR circuit to supply the START signal to motor drive circuit 24. Another input to this mixing circuit is supplied from a voice discriminator 46 which, in turn, is coupled to buss 13 via a mixing resistor and which is adapted to sense an audio signal on buss 13 and to produce an output signal upon the termination of such audio signal. This output signal is supplied through mixing circuit 36 as a START signal for motor drive circuit 24 and, additionally, is supplied through a mixing circuit 50 for a purpose to be described. Voice discriminator 46 may be of a well-known type which includes a timing circuit that is energized in the absence of an audio signal. If the audio signal is not present for a predetermined time duration, the timing circuit included in voice discriminator 46 "times out" to produce the aforementioned output signal. As shown, this output signal also is supplied to line seize relay 34 so as to de-energize this relay, thereby opening relay contacts 34a and 34b, and thus releasing telephone line 10. The voice discriminator may assume a standby condition until a suitable ON signal is applied thereto. Also, the operation of voice discriminator 46 may be inhibited either by supplying an inhibit signal, as will be described below in conjunction with FIGS. 3A and 3B, or by supplying an OFF signal thereto, such as when incoming message tape T-2 is rewound to enable messages recorded thereon to be played back.

In some locations, telephone company central offices supply particular pulse signals to the telephone line when a calling party hangs up. Such pulses, known as Calling Party Control (CPC) pulses can be detected and used as an indication that a caller has hung up. Accordingly, a hang-up detecting circuit 52 is AC coupled to buss 13 via a differentiating capacitor 51 for the purpose of detecting such CPC pulses and also transient pulses which are caused when the calling party hangs up, and for producing an output signal in response thereto. As shown, the output of hang-up detecting circuit 52 is coupled to the output of voice discriminator 46 to permit similar usage of the output signals produced by these respective circuits.

A marker signal detector 38 is coupled to head 16 and is adapted to sense a marker signal, such as a predetermined marker tone or tones, which had been recorded on the track of tape T-1 associated with head 16 and which then is reproduced by that head. Since this marker signal generally is recorded as the end-of-announcement signal, marker detector 38 is adapted to produce an output signal, for example, at the completion of the marker signal which is used to indicate the end of an announcement message and to energize a motor drive circuit 44. This motor drive circuit may be similar to motor drive circuit 24 and is coupled to T-2 motor 18 for energizing that motor when the motor drive circuit is actuated. Accordingly, the output of marker detector 38 is coupled to a switching circuit 42, represented herein as a bistate device, such as a flip-flop circuit or the like, the switching circuit being responsive to an input signal applied thereto for actuating motor drive circuit 44. A mixing circuit 40, similar to aforedescribed mixing circuit 36, is provided to supply the signal produced by marker detector 38 to a switching input of switching circuit 42, this switching input being described, for convenience, as a "set" input for setting, or energizing, switching circuit 42 to an appropriate state, or condition, represented by a suitable output signal for actuating motor drive circuit 44. As one example thereof, motor drive circuit 44 may include drive transistors which are connected in series with the energizing windings of motor 18 such that when the motor drive circuit is actuated, a reference voltage, such as ground, is applied to one side of the energizing windings, thereby enabling current to flow therethrough.

The signal produced by switching circuit 42 when energized also is supplied as an OFF signal to motor drive circuit 24, thereby de-energizing motor 12 while motor 18 is operating. Switching circuit 42 is, in turn, adapted to be de-energized when motor drive circuit 24 is energized. Accordingly, as shown, the output signal produced by motor drive circuit 24 to energize motor 12 also is supplied to a "reset" input of switching circuit 42 so as to reset, or de-energize this switching circuit. A mixing circuit 50 is provided to couple the output signal of motor drive circuit 24 to the reset input of switching circuit 42. Mixing circuit 50 also receives the output signal produced either by voice discriminator 46 or hang-up detecting circuit 52 for the purpose of resetting switching circuit 42.

A record/playback circuit 30 is coupled to buss 13 by a mixing resistor, as shown. The record/playback circuit includes suitable amplifiers so that an audio signal which is received thereby from buss 13 is recorded on tape T-1 by head 20. Accordingly, a record output terminal of record/playback circuit 30 is coupled via a relay contact $K_1$ to head 20. Since the illustrated telephone answering apparatus is adapted to perform a message retrieval operation, it is appreciated that messages which are recorded on tape T-2 may be reproduced therefrom by head 20 and transmitted over telephone line 10. To this effect, record/playback circuit 30 includes a playback input terminal adapted to be coupled to head 20 via relay contact $K_1$ so as to receive the reproduced messages and to apply same to buss 13 via the illustrated mixing resistor. Hence, the record output terminal of record/playback circuit 30 is coupled to a record contact R adapted to be contacted by relay contact K-1 during a message recording operation; and the playback input terminal of record/playback circuit 30 is coupled to a playback contact P which is adapted to be contracted by relay contact K-1 during a message retrieval operation. As shown, a selectively energizable relay K is associated with relay contact K-1 and also with an additional relay contact K-2, the latter being connected to head 22. Depending upon the selective energization of relay K, contact K-2 is adapted to engage a recording contact R or a playback contact P. Head 22 is provided for recording a predetermined tone signal on a separate track of tape T-2 during an incoming message recording operation, and to reproduce that tone signal during a message retrieval operation. In this regard, head 22 is coupled via relay contact K-2 and recording contact R to the output of a tone detector 54. Also, head 22 is coupled via relay contact K-2 and playback contact P to another tone detector 70.

Tone detector 54 is coupled to buss 13 via a mixing resistor and is adapted to detect a tone signal having the particular frequency generated by tone generator 6 (FIG. 1). When detected, this tone signal is recorded by head 22 on tape T-2. Tone detector 54 also is adapted to produce an output signal, such as a voltage of predetermined level, when the tone signal produced by tone generator 6 is applied to telephone line 10 and, via transformer 11, to buss 13. This tone detect signal is supplied to the set input of switching circuit 42 via mixing circuit 40 for the purpose of energizing this switching circuit and thereby actuate motor drive circuit 44 while deactuating motor drive circuit 24. The tone detect signal also is applied to a timing circuit 56 which is adapted to generate an output timing signal of predetermined duration provided that the tone detect signal subsists for a length of time. The timing circuit is of the type which is adapted to be triggered so as to perform only a single timing operation. Hence, timing circuit 56 may be referred to as a one-cycle timer. Thus, until it is reset, the one-cycle timer will not be retriggered to generate another timing signal even though further tone signals may be supplied to and detected by tone detector 54.

The output of one-cycle timer 56 is coupled to switching circuits 58 and 68, respectively, as well as to a gating circuit 62. Switching circuits 58 and 68 may be similar to aforedescribed switching circuit 42. When energized, switching circuit 58 is adapted to produce an output signal which is used to condition gate 62 and also gate 60. Gates 60 and 62 function as coincidence circuits, such as AND gates, whereby an output signal is produced only if input signals are applied thereto in coincidence. Thus, gate 62 is actuated to produce an output signal if switching circuit 58 is energized and if one-cycle timer 56 produces a timing signal. Gate circuit 60 has an input coupled to tone detector 54 and is adapted to be actuated to produce an output signal only if switching circuit 58 is energized and tone detector 54 produces the tone detect signal. The signals produced by gate circuits 60 and 62 are applied through a mixing circuit 64 to energize rewind solenoid 66 and, also, to apply the OFF signal to voice discriminator 46. Hence, when either gate 60 or gate 62 is actuated, rewind solenoid 66 is energized such that motor 18 drives tape T-2 in reverse direction. When neither gate 60 nor gate 62 is actuated, rewind solenoid 66 is de-energized and motor 18 is adapted to drive tape T-2 in its normal, forward direction.

Switching circuit 68 is adapted, when energized, to apply an energizing signal to relay K, thereby energizing this relay such that its relay contacts K-1 and K-2 engage the respective playback contacts P. When relay K is de-energized, as when switching circuit 68 is de-energized, relay contacts K-1 and K-2 return to engagement with their respective recording contacts R.

A tone detector 70, similar to tone detector 54, is coupled to the playback contact P associated with relay contact K-2. It is recalled that, during an incoming messsage recording operation, if a particular tone is transmitted to the telephone answering apparatus via telephone line 10, as from tone generator 6 (FIG. 1), this tone is supplied from tone detector 54 to head 22 via recording contact R and relay contact K-2. During a message retrieval operation, relay contact K-2 is in engagement with playback contact P. Hence, if a previously recorded tone signal is detected by head 22, tone detector 70 produces a tone detect signal in response thereto. The output of tone detector 70 is coupled to mixing circuit 64 by a capacitor 72 for the purpose of energizing rewind solenoid 66 for a short duration in response to the detected played back tone. This brief energization of rewind solenoid 66 results in motor 18 rewinding a small portion of tape T-2 for a purpose soon to be understood. The output of tone detector 70 also is coupled to the respective reset inputs of switching circuits 58 and 68 and, via mixing circuit 50, to the reset input of switching circuit 42. Hence, when the previously recorded tone is played back from tape T-2, each of switching circuits 42, 58 and 68 is reset, or de-energized.

As will soon be seen, at the conclusion of telephone communication, line seize relay 34 is de-energized, thereby releasing telephone line 10. At that time, motor drive circuit 24 will be actuated to energize motor 12 and thereby drive tape T-1. It is recalled that this tape is formed in an endless loop. Hence, when the beginning of the announcement message is reached, tape T-1 is in proper condition for reuse in response to the next incoming telephone call. In this regard, the announcement message may be preceded by a start-of-message signal or, alternatively, a fixed marker indication may be provided on tape T-1. In either case, a start-of-tape sensor 74 is provided so as to sense either the start-of-message signal or the marker indicator. The output of start-of-tape sensor 74 is coupled to motor drive circuit 24 and is adapted to apply a RESET signal thereto, and also is coupled to voice discriminator 46 and is adapted to supply an ON signal for restoring the voice discriminator to its standby condition in preparation for the next incoming telephone call.

The manner in which the illustrated remotely controlled message-retrievable telephone answering apparatus operates now will be described. The following description contemplates three modes of operation: (1) recording the announcement message; (2) responding to an incoming telephone call; and (3) retrieving the previously recorded messsages.

(1) RECORDING THE ANNOUNCEMENT MESSAGE

Microphone 28 is suitably connected to record/-playback circuit 16. Upon actuation of the microphone, a START signal is produced by the record/playback circuit and is applied to actuate motor drive circuit 24. Hence, motor 12 is energized and tape T-1 is driven past heads 14 and 16. Also, record/playback circuit 26 is conditioned for a recording operation so as to supply audio signals from microphone 28 to record head 14. When the user has completed his announcement message, a suitable control is operated (such as releasing the aforedescribed push-to-record switch), whereby a marker signal of predetermined frequency is applied to head 16 and is recorded on the separate track associated therewith. At the same time, the START signal which had been applied to actuate motor drive circuit 24 is terminated. A suitable switch, such as one of switches 4 (FIG. 1) then may be actuated so as to actuate motor drive circuit 24, whereby tape T-1 is cycled to return to the beginning of the recorded announcement message. When tape T-1 is so positioned, start-of-tape sensor 74 applies a RESET signal to the motor drive circuit, thereby deactuating this circuit, and also applying an ON signal to voice discriminator 46 so as to establish its standby condition. If desired, the recorded announcement message can be verified by actuating another one of switches 4. If the announcement message is satisfacotry, microphone 28 may be removed, and the illustrated apparatus assumes its ready, or standby condition.

(2) RESPONDING TO AN INCOMING TELEPHONE CALL

Let it be assumed that tape T-1 is positioned at the beginning of the announcement message recorded thereon. When an incoming telephone call is received, a ringing signal applied to telephone line 10 is detected by ring detector 32 to energize line seize relay 34. Also, a START signal is applied from the ring detector through mixing circuit 36 to actuate motor drive circuit 24.

When line seize relay 34 is energized, relay contacts 34a and 34b are closed to seize telephone line 10 and to connect record/playback circuit 26 to buss 13. In this mode, the amplifier circuitry which is included in record/playback circuit 26 has an input coupled to head 14 and an output coupled to buss 13 such that the previously recorded announcement message can be reproduced and played back over buss 13, transformer 11 and telephone line 10 to the calling party. At the conclusion of the announcement message, the previously recorded marker signal is transmitted via record/playback circuit 26 to the calling party so as to apprise him of the availability of tape T-2 for recording his message. The marker signal also is played back by head 16 and detected by marker detector 38.

Upon detecting the marker signal, marker detector 38 supplies an energizing signal through mixing circuit 40 to energize switching circuit 42. Hence, motor drive circuit 44 is actuated and motor drive circuit 24 is deactuated. Consequently, tape T-1 is stopped and tape T-2 now is driven. Voice signals which are transmitted from the calling party via telephone line 10 to the illustrated telephone answering apparatus are coupled through transformer 11 and buss 13 to record/playback circuit 30 so as to be recorded on tape T-2 by head 20. At the same time, these voice signals are detected by voice discriminator 46.

At the conclusion of the incoming message, voice discriminator 46 detects the absence of voice signals on buss 13. After a suitable time-out period, the voice discriminator produces an output signal which is supplied through mixing circuit 50 to de-energize switching circuit 42, thereby deactuating motor drive circuit 44. Also, the OFF signal which had been applied to motor drive circuit 24 by energized switching circuit 42 now is removed. The output of voice discriminator 46 also is applied as an OFF signal to line seizure relay 34, thereby de-energizing this relay so as to open contacts 34a and 34b, whereby telephone line 10 is released. Additionally, the output signal produced by voice discriminator 46 is supplied as the START signal to motor drive circuit 24 via mixing circuit 36, thereby actuating the motor drive circuit so as to energize motor 12 and drive tape T-1 through a complete cycle. When tape T-1 completes its cycle, the beginning of the recorded announcement message is detected by start-of-tape sensor 74, whereupon motor drive circuit 24 is reset and voice discriminator 46 is conditioned to its standby condition. The illustrated apparatus now is prepared to respond to the next incoming telephone call.

(3) REMOTE MESSAGE RETRIEVAL

If the user of the illustrated telephone answering apparatus initiates a telephone call thereto from a remote station, the apparatus will operate in the manner just described. Accordingly, after the prerecorded announcement message is transmitted, motor drive circuit 24 is deactuated and motor drive circuit 44 is actuated. if desired, the user now may record a brief message on tape T-2. As will be explained, this brief message is advantageous in that, upon playback, it apprises the user that he has retrieved all of the previously recorded messages from tape T-2. Assuming that this brief message is recorded, the user now actuates tone generator 6 (FIG. 1) so as to transmit the predetermined tone signal over telephone line 10, to transformer 11 to buss 13. This tone signal is recorded on tape T-2 by record/playback circuit 30 and also is detected by tone detector 54. Hence, this detected tone is further recorded on the other track of tape T-2 by head 22. Tone detector 54 also generates the tone detect signal which is applied to one-cycle timer 56. This tone detect signal also is applied through mixing circuit 40 to switching circuit 42. However, since this switching circuit had been energized in response to the marker signal detected by marker detector 38, the tone detect signal has no effect thereon at this time.

If tone generator 6 is actuated for a minimum length of time, the tone detect signal will be of sufficient duration to actuate, or trigger one-cycle timer 56. Accordingly, a timing signal of predetermined duration is produced to energize switching circuit 58. When energized, switching circuit 58 conditions gate circuits 60 and 62. Thus, the tone detect signal generated by tone detector 54 is transmitted through conditioned gate 60 and mixing circuit 64 so as to energize rewind solenoid 66. Consequently, motor 18 rewinds tape T-2. The signal which is used to energize rewind solenoid 66 also deactivates voice discriminator 46 so as to avoid inadvertent or undesired line release during the message retrieval operation. Since gate circuit 62 also had been conditioned to transmit the timing signal produced by one-cycle timer 56 through mixing circuit 64 to rewind solenoid 66, it is appreciated that tone generator 6 (FIG. 1) can be deactuated withot halting the rewinding of tape T-2. That is, one-cycle timer 56 insures that at least a portion of tape T-2 will be rewound. At the conclusion of this timing signal, rewind solenoid 66 is de-energized and motor 18 now drives tape T-2 in its forward direction such that the previously recorded messages can be played back.

When triggered, one-cycle timer 56 also energizes switching circuit 68 so as to, in turn, energize relay K. Accordingly, contacts K-1 and K-2 are switched to engage their respective playback contacts P. Therefore, the messages which had been recorded previously on tape T-2 are detected by head 20, supplied to record/playback circuit 30 and transmitted over buss 13, through transformer 11 and telephone line 10 to the remote station. In this manner, the user of the illustrated apparatus can retrieve the previously recorded messages.

In the event that tape T-2 had not been rewound sufficiently for all of the previously recorded messages to be retrieved, or in the event that a played back message should be repeated, the user may actuate tone generator 6 to supply a further tone signal to the telephone line. This further tone signal is detected by tone detector 54 to supply the tone detect signal to gate 60. Since switching circuit 58 had remained energized, this additional tone detect signal is transmitted through gate 60 and mixing circuit 64 to re-energize rewind solenoid 66. Hence, motor 18 rewinds tape tape T-2 for as long as tone generator 6 is actuated.

When all of the previously recorded messages have been played back, the user will recognize the brief message which he recorded immediately prior to retrieving those messages. Following this brief message, the tone which had been recorded by heads 20 and 22 will be reproduced. Tone detector 70 detects the tone reproduced by head 22 to produce a tone detect signal in response thereto. Capacitor 72 is charged by this tone detect signal so as to energize rewind solenoid 66 via mixing circuit 64 for a relatively brief duration. Consequently, motor 18 rewinds a small portion of tape T-2. At this time, the tone detect signal produced by tone detector 70 de-energizes switching circuits 58 and 68. Thus, gates 60 and 62 no longer are conditioned to energize rewind solenoid 66; and relay K is de-energized. Hence, contacts K-1 and K-2 return to engage their respective recording contacts R. Hence, heads 20 and 22 are conditioned for a recording operation, if desired.

The amount of tape T-2 which had been rewound in response to the tone detect signal produced by tone detector 70 preferably corresponds to that portion of the tape upon which the previously received tone had been recorded. Since head 20 now is conditioned for a recording operation, this previously recorded tone is erased. Also, if desired, the user of the apparatus can record an additional message on tape T-2 for a limited periof of time. To this effect, an additional timing circuit (not shown) may be responsive to the tone detect signal produced by tone detector 70 so as to delay the resetting of one-cycle timer 56 and to delay the de-energization of switching circuit 42. At the conclusion of this delay, that is, when the additional timing circuit times out, one-cycle timer 56 is reset so as to be able to respond to a subsequently transmitted tone signal, as during another message retrieval operation, and switching circuit 42 is de-energized so as to deactuate motor drive circuit 44. Also, voice discriminator 46 is triggered to de-energize line seize relay 34 and to apply a START signal to motor drive circuit 24. Thus, telephone line 10 is released and motor 12 is energized to drive tape T-1 through its complete cycle. When tape T-1 has been recycled, the beginning of the announcement message is sensed by start-of-tape sensor 74, whereupon motor drive circuit 24 is reset and voice discriminator 46 is conditioned to its standby condition. The illustrated apparatus now is prepared to respond to the next incoming telephone call.

In one embodiment of telephone answering apparatus, tone generator 6 may be selectively actuated after all of the previously recorded messages have been retrieved so as to essentially erase tape T-2. This feature may be carried out by providing an additional gate circuit having one input coupled to receive the tone detect signal produced by tone detector 54 and another input coupled to receive the timing signal produced by the aforementioned additional timing circuit (not shown). Thus, if the user actuates tone generator 6 after tone detect circuit 70 detects the previously recorded tone signal, the additional gate circuit (not shown) will be energized. A switching circuit, such as a bistate circuit, can be energized in response thereto in order to applying a substantially continuous energizing signal to rewind solenoid 66. Thus, motor 18 will rewind tape T-2 until the additional switching circuit (not shown) is de-energized. If a conventional no-motion detector is provided to sense when all of tape T-2 has been rewound, the no-motion detector can de-energize this switching circuit. Also, in order to delay the de-energization of switching circuit 42 while the additional switching circuit (not shown) is energized, energization of this additional switching circuit can be used to interrupt the timing out of the additional timing circuit (not shown) which had been triggered in response to the tone detect signal produced by tone detector 70.

While the illustrated apparatus can be operated to record and retrieve messages which had been transmitted to tape T-2 from telephone line 10, it is appreciated that other messages can be recorded directly on the incoming message tape for subsequent retrieval by the user of the apparatus. Accordingly, a microphone (not shown) may be connected to record/playback circuit 30 so as to facilitate this direct recording of messages. Such directly recorded messages will, of course, be retrieved by the user in accordance with the aforedescribed message retrieval operation.

AUTOMATIC PAGING APPARATUS

In accordance with one application thereof, the present invention is adapted to be used with telephone answering apparatus of the type described hereinabove in conjunction with FIGS. 2A and 2B for the purpose of apprising a user that an incoming message had been recorded on tape T-2 and is awaiting retrieval. As described previously, it is appreciated that such recorded messages can be retrieved in response to an incoming telephone call initiated by the user. In accordance with one feature of the present invention, remote telephone number information can be recorded on tape T-1 such that, after an incoming message is received and recorded on tape T-2, this recorded telephone number information is used to initiate an outgoing telephone call to a remote station whereat the user may be located. Upon being apprised of the existence of a recorded message awaiting retrieval, the called user then can retrieve this message.

In accordance with another feature of the present invention, the telephone number information which is recorded on tape T-1 may be associated with a commercial radio paging service. Hence, after an incoming message is recorded, the telephone answering apparatus may be actuated to initiate an outgoing telephone call to the paging installation and to communicate with that installation such that the user (assumed to be a subscriber to that paging service) is paged. In this manner, the user can retrieve the previously recorded message by initiating a telephone call to this telephone answering apparatus, as described above.

In accordance with a still further feature of this invention, a user can revise the information which is recorded on tape T-1 from any remote telephone station. Thus, the announcement message can be modified, and the remote telephone number information which may be recorded on tape T-1 can be changed. Such revision, or reprogramming of the announcement message tape, may be carried out either in response to an incoming telephone call initiated by the user or in response to an outgoing telephone call initiated by the telephone answering apparatus.

INITIATING AN OUTGOING TELEPHONE CALL

Figure 3A:
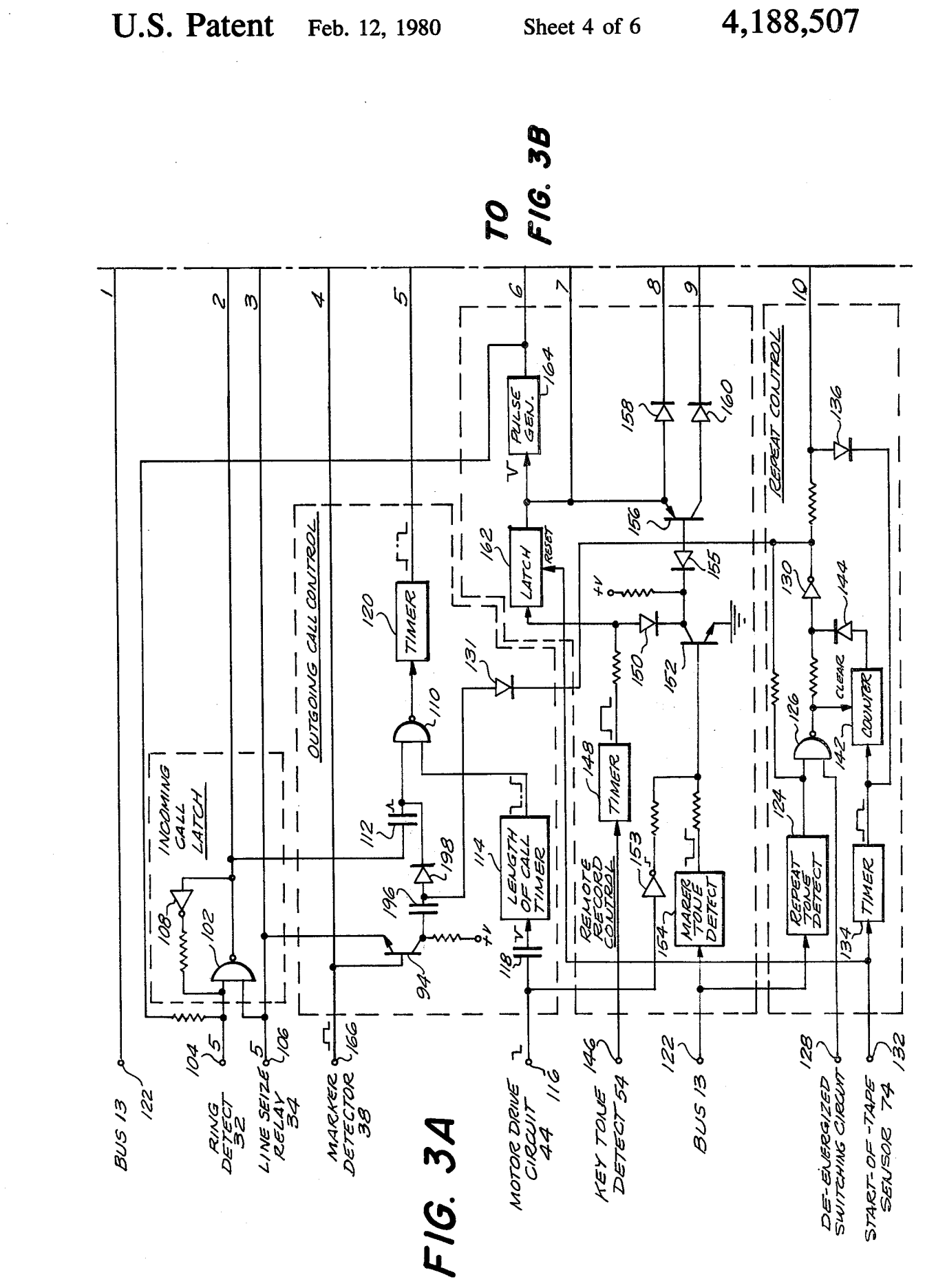
Figure 3B:
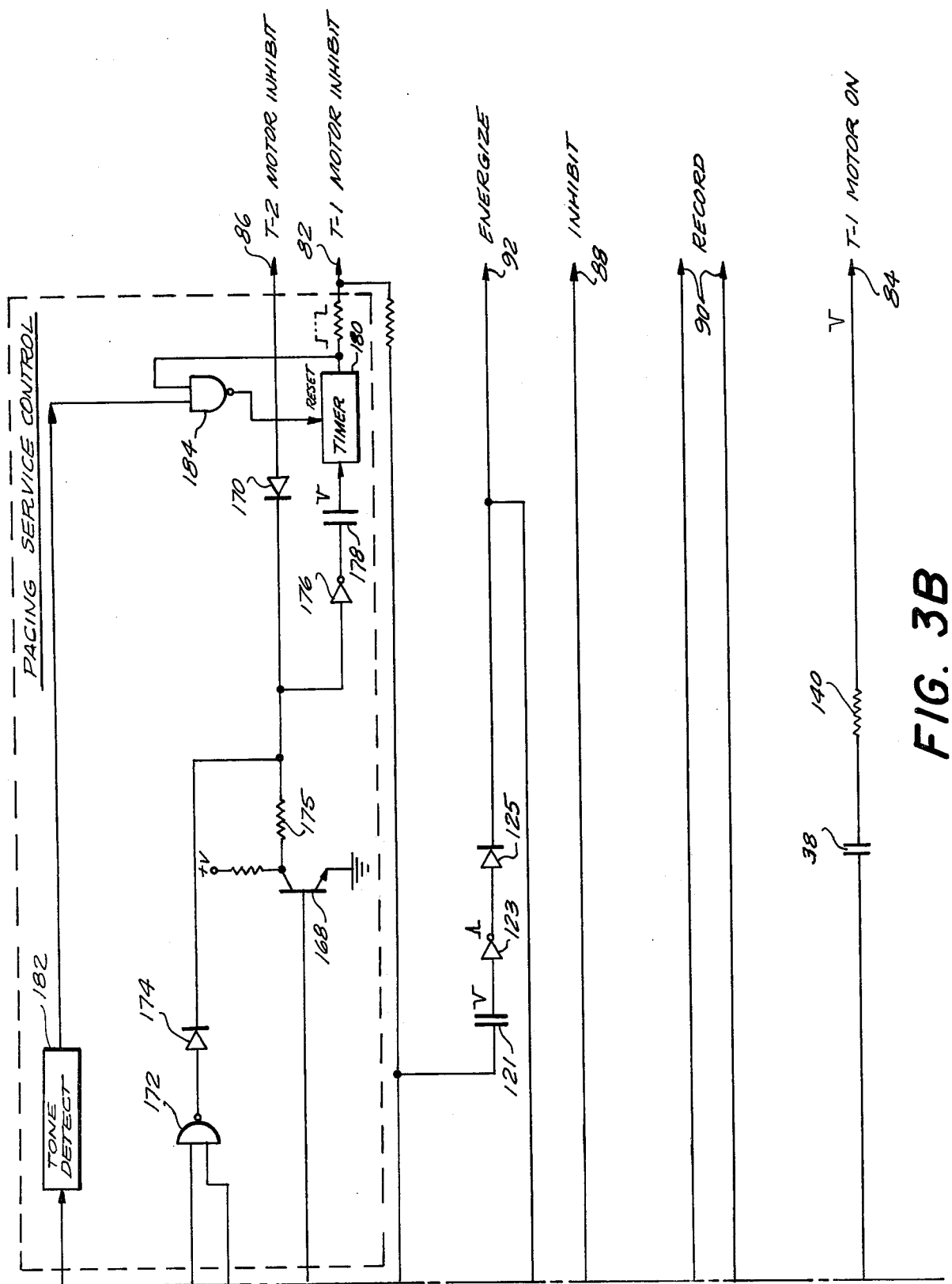

Referring now to FIGS. 3A and 3B, the apparatus for initiating an outgoing telephone call in response to the recording of an incoming message is comprised of an incoming call latch circuit and a call control circuit. The incoming call latch circuit may be of conventional construction, and here is illustrated as comprising a NAND gate 102 having a pair of inputs and an output which is fed back to one of its inputs via an inverter 108. As is understood by those of ordinary skill in the art, a NAND gate is a coincidence circuit which is adapted to produce a binary "0" only when a binary "1" is applied in coincidence to each of its inputs. For the purpose of the present discussion, it will be assumed that a binary "1" is represented by a relatively positive, or higher voltage level, and a binary "0" is represented by a relatively lower voltage level, such as ground. Of course, alternative voltage levels and polarities can be used to represent the respective binary signals.

One input of NAND gate 102 is coupled to terminal 104 and is adapted to receive a binary "1" when ring detector circuit 32 is energized. The other input of NAND gate 102 is coupled to a terminal 106 and is adapted to receive a binary "1" when line seize relay 34 is energized. The output of NAND gate 102 is coupled through a capacitor 112 to one input of a NAND gate 110 included in the call control circuit.

The call control circuit includes, in addition to NAND gate 110, a timing circuit 114, an additional timing circuit 120 and a series circuit formed of capacitor 121, inverter 123 and a diode 125. One input of NAND gate 110 is coupled to the output of NAND gate 102 through capacitor 112, as described, and the other input of NAND gate 110 is coupled to the output of timing circuit 114. Timing circuit 114 is a conventional negativetriggered timing circuit that is actuated in response to a negative transition so as to produce a negative output pulse, as shown, for a predetermined timing duration. Thus, timing circuit 114 produces a binary "1" at all times except when triggered to perform a timing operation in response to a negative transition. The input of timing circuit 114 is coupled through a capacitor 118 to a terminal 116 so as to receive a signal produced by motor drive circuit 44 when that circuit is actuated. As shown in FIG. 3A, a binary "1" is applied to terminal 116 when motor drive circuit 44 is not actuated, and this binary "1" undergoes a negative transition in response to the actuation of the motor drive circuit.

The output of NAND gate 110 is coupled to timing circuit 120 which generates an output pulse of predetermined duration in response to a negative transition at the output of NAND gate 110. This timing pulse is applied as T-1 motor inhibit signal to an output terminal 82. With reference to FIG. 2A, this output terminal 82 is coupled to motor drive circuit 24 so as to apply the T-1 motor inhibit signal thereto. The output of timing circuit 120 also is coupled through capacitor 121, inverter 123 and diode 125 to produce an ENERGIZE signal at an output terminal 92. As shown in FIG. 2A, output terminal 92 is coupled to ring detecting circuit 32 so as to supply the ENERGIZE signal thereto.

The input of NAND gate 110 which is coupled to the incoming call latch circuit also is coupled to a trigger circuit formed of, for example, transistor 194, capacitor 196 and diode 198. Transistor 194 preferably is an NPN transistor whose emitter is coupled to input terminal 106 and whose base electrode is coupled to an input terminal 166. Terminal 166 is adapted to receive the output signal produced by marker tone detector 38 when a marker tone signal is reproduced from tape T-1 by head 16 (FIG. 2A). The collector electrode of transistor 194 is coupled via capacitor 196 and diode 198 to the input of NAND gate 110.

In accordance with one advantageous feature of the present invention, the call control circuit shown in FIG. 3A may be triggered a repeated number of times in the event that the user does not retrieve a recorded message. This repeat function is carried out by a repeat circuit formed of a repeat tone detector 124, a repeat latch circuit comprised of NAND gate 126 and inverter 130, a timing circuit 134 and a counter 142. NAND gate 126 of the repeat latch circuit has one input coupled to an input terminal 128 to which a signal is applied representing that switching circuit 68 (FIG. 2B) is not energized. The other input of NAND gate 126 is adapted to receive a signal which is selectively produced only in the event that a repeat operation is to be performed. As will be described, if this repeat operation is desired, a predetermined tone signal, hereinafter a repeat tone signal, is applied to buss 13 (FIG. 2A) and is detected by repeat tone detector 124 to apply the selected signal to NAND gate 126. If the repeat tone signal is detected and if switching circuit 68 is not energized, NAND gate 126 is actuated to produce a binary "0" which, in turn, is inverted by inverter 130 to a binary "1" to be fed back to the NAND gate so as to maintain it in its actuated condition.

Timing circuit 134 includes an input coupled to input terminal 132 for receiving a signal from start-of-tape sensor 74 (FIG. 2A) representing that the announcement message tape has been recycled back to its beginning or standby position. Thus, when the beginning of the announcement message recorded on tape T-1 is sensed, timer 134 is actuated to generate an output pulse (as shown) for a predetermined duration. As will be seen, this duration determines the time period between successive, repeated outgoing telephone calls. The output of timing circuit 134 is coupled to counter 142, the latter being a negative-edge triggered binary counter, so as to increment this counter in response to each start-of-tape detection. The output of timing circuit 134 also is coupled via a negatively poled diode 136 and a current limiting resistor to the output of inverter 130. The junction of the current limiting resistor and the anode of diode 136 is coupled via a differentiating network formed of capacitor 138 and resistor 140 to an output terminal 84. It may be appreciated that when the repeat latch circuit is actuated, a negative pulse is applied to output terminal 84 upon the termination of the timing pulse generated by timing circuit 134. FIG. 2A shows that output terminal 84 is coupled to motor drive circuit 24 to supply an actuating signal thereto.

Counter 142 may be a conventional binary counter having respective output terminals which are selectively energized when the counter attains a count of 1, 2, 4, 8, . . . , respectively. A diode 144 is selectively coupled to a desired one of these output terminals, such as the output terminal associated with count 4, so as to apply a binary "1" to the input of inverter 130 when counter 142 attains a corresponding count. Since the counter is incremented in response to each repeated outgoing call operation, it is seen that inverter 130 is supplied with a binary "1" when the preselected number of such repeated outgoing telephone calls has been made. Inverter 130 is adapted to respond to this binary "1" to supply a binary "0" to NAND gate 126, thereby deactuating this NAND gate and releasing the repeat latch. When the NAND gate is deactuated, a binary "1" is produced thereby and is supplied as a CLEAR signal to counter 142, thereby resetting this counter to an initial, or zero, count.

Output terminal 82 (FIG. 3B), which is adapted to receive a timing signal, such as a pulse of predetermined duration, from timing circuit 120 is coupled to motor drive circuit 24 (FIG. 2A) so as to inhibit the actuation of this motor drive circuit for the duration of the timing signal. Output terminal 84 (FIG. 3B), which is supplied with a negative pulse during a repeat operation, is coupled to motor drive circuit 24 (FIG. 2A) and functions to actuate this circuit. As may be appreciated, a negative pulse applied to output terminal 84 functions in a manner which is analogous to that of the START signal described above. Output terminal 92 (FIG. 3B), which is adapted to receive a positive pulse produced by the combination of capacitor 121, inverter 123 and diode 125 upon the termination of the timing signal produced by timing circuit 120, is supplied to ring detector circuit 32 (FIG. 2A) as an ENERGIZE signal so as to energize this ring detector circuit in the same manner as if an incoming ringing signal had been detected.

Before proceeding with a description of the additional circuitry shown in FIGS. 3A and 3B, the operation of the outgoing call initiating circuit will be described. When an incoming call is received, ring detector circuit 32 is energized and line seize relay 34 also is energized. Hence, a binary "1" is supplied to each of input terminals 104 and 106 (FIG. 3A), thereby actuating NAND gate 102 to produce a binary "0". This NAND gate is maintained in its actuated condition for as long as the line seize relay is energized.

As discussed above, after the announcement message recorded on tape T-1 is played back to the incoming caller, motor drive circuit 24 is deactuated and motor drive circuit 44 is actuated so as to energize motor 18 to drive incoming message tape T-2. When motor drive circuit 44 is actuated, a binary "0" is applied to input terminal 116. This negative transition is coupled through capacitor 118 to actuate timing circuit 114. Hence, a negative pulse of predetermined duration is applied by timing circuit 114 to NAND gate 110.

Let it be assumed that the incoming telephone call subsists for a duration greater than the timing constant of timing circuit 114. Hence, when the signal applied to NAND gate 110 by timing circuit 114 returns to its binary "1" level, line seize relay 34 still will be energized, and NAND gate 102 will be maintained in its actuated condition. Now, when the incoming caller completes his message, voice discriminator 46 detects the absence of voice signals on buss 13, and therefore de-energizes line seize relay 34. Alternatively, if telephone line 10 is provided with CPC capability, hand-up detector 52 will detect when the incoming caller hangs up, and the hang-up detector will de-energize line seize relay 34. In either case, when the line seize relay is de-energized, NAND gate 102 is deactuated so as to produce a binary "1" at its output. Capacitor 112 couples a positive pulse from the output of NAND gate 102 to an input of NAND gate 110, thereby actuating this NAND gate and triggering timing circuit 120. The timing signal which is produced by timing circuit 120 is applied to output terminal 82 so as to inhibit motor drive circuit 24 for the duration of this timing signal. This inhibit duration provides sufficient time to complete the release of telephone line 10 and return the telephone system operating equipment to its normal condition.

At the conclusion of the timing signal, motor drive circuit 24 no longer is inhibited, and thus re-energizes motor 12 so as to drive tape T-1. Also, at the conclusion of this timing signal, a positive pulse is applied to output terminal 92 so as to energize ring detector circuit 32. Thus, line seize relay 34 is energized so as to close relay contacts 34*a* and 34*b,* thereby seizing telephone line 10 and coupling the playback amplifiers included in record/playback circuit 26 to buss 13.

While tape T-1 is driven, the information which had been recorded on the remaining portion thereof is transmitted from head 14, through record/playback circuit 26, over buss 13, through transformer 11 to telephone line 10. If, when preparing the announcement message tape, the user operates the Touch-Tone dialing switches on his telephone instrument following the recording of his announcement message, then corresponding Touch-Tones will be recorded on tape T-1. These tones represent information corresponding to a desired remote telephone number. Alternatively, if the user's telephone instrument is not provided with Touch-Tone dialing switches, he can selectively energize a separate Touch-Tone pad, such as pad 7 shown in FIG. 1. Thus, it is assumed that announcement message tape T-1 has recorded thereon a start-of-message indication, an announcement message, a marker signal and information representing a remote telephone number. Preferably and for a reason that will be appreciated, the information representing the remote telephone number is separated from the marker signal by a blank interval of sufficient duration. If desired, a page message can be recorded on the remaining portion of tape T-1 following the remote telephone number information. Such a page message may be, for example, "There is a message waiting for you;" or "Please retrieve your incoming messages;" etc.

Therefore, when an ENERGIZE signal is applied to output terminal 92 (FIG. 3B) so as to energize ring detector circuit 32 (FIG. 2A), telephone line 10 is seized and motor drive circuit 24 is actuated. It is recalled that, when motor drive circuit 24 had been deactuated during an incoming message recording operation, tape T-1 had stopped upon reaching the recorded marker signal. Therefore, when motor 12 is re-energized so as to continue driving tape T-1, the remaining information which had been recorded thereon, that is, the remote telephone number information and (optionally) the page message are reproduced. Since the recorded telephone number information had been in the form of Touch-Tone frequencies, these tones are played back and supplied through record/playback circuit 26 to buss 13 and thence to telephone line 10 so as to dial the desired remote telephone number. The aforementioned blank interval separating the recorded marker signal and the remote telephone number information now is seen to provide a sufficient delay in order to insure that a dial tone is applied to telephone line 10 following the energization of line seize relay 34, before the remote telephone number is dialed.

If the user, who is assumed to be located at the telephone station associated with the dialed remote telephone number, picks up the telephone, he will hear the page message which he had recorded on the remaining portion of tape T-1, and thereby be apprised that an incoming message had been recorded on tape T-2 and is awaiting retrieval. Such message can be retrieved from tape T-2 by the selective actuation of tone generator 6 (FIG. 1) in the manner discussed in detail above.

The aforedescribed call initiating operation had assumed that the incoming message recorded on tape T-2 was of a duration greater than the time constant of timing circuit 114. If the incoming message had been of shorter duration, such as if the calling party returned to an on-hook condition without recording any message, it is appreciated that a negative pulse will be applied to NAND gate 110 at the time that NAND gate 102 is deactuated in response to de-energization of line seize relay 34. That is, telephone line 10 will be released before the signal produced by timing circuit 114 can return to its binary "1" level. Therefore, the deactuation of NAND gate 102 will not trigger NAND gate 110, and timing circuit 120 will not be energized. Consequently, an ENERGIZE signal will not be applied to ring detector circuit 32. Nevertheless, motor drive circuit 24 will be actuated to energize motor 12 and recycle tape T-1 to the beginning of the recorded announcement message in the manner described hereinabove with respect to FIGS. 2A and 2B, but the remaining information recorded on tape T-1 will not be transmitted over telephone line 10.

In the absence of a repeat operation, when tape T-1 has been recycled back to its start-of-message indication, the telephone answering apparatus will be in condition to receive the next incoming telephone call. However, let it be assumed that an incoming message is important and should be retrieved promptly by the user of the apparatus. A portion of the recorded announcement message may include instructions to the incoming caller that, if his message is of extreme importance, he should operate a particular tone switch such as the * switch included in Touch-Tone telephone dialing switches. When the corresponding tone is transmitted to the telephone answering apparatus, this tone is applied to buss 13 and, through input terminal 122 (FIG. 3A) to tone detector 124. At this time, that is, during an incoming message record operation, switching circuit 68 is not energized. Hence, upon detecting the predetermined (*) tone, a binary "1" is applied to each input of NAND gate 126, thereby actuating this NAND gate and actuating the repeat latch. Consequently, inverter 130 produces a binary "1".

Upon conclusion of the incoming telephone call, tape T-1 is recycled as discussed above. If the duration of the incoming call exceeded the time constant of timing circuit 114, telephone line 10 will be seized during the recycling of tape T-1 so that the prerecorded telephone number information will be played back thereover, thereby dialing the remote telephone number. Alternatively, if the duration of the incoming telephone call did not exceed the time constant of timing circuit 114, tape T-1 nevertheless will be recycled until the start-of-message indication is reached. In either event, if tape T-1 is recycled and if the message recorded on tape T-2 had not be retrieved, the sensing of the start-of-message indication by start-of-tape sensor 74 will trigger timing circuit 134 (FIG. 3A) to produce a timing signal of predetermined duration. If it is assumed that the load resistor coupled between inverter 130 and diode 136 is of a relatively higher resistance, then diode 136 normally is conductive when timing circuit 134 is not triggered. The voltage across this resistor during the conduction of diode 136 is approximately equal to the voltage level corresponding to a binary "1". However, when timing circuit 134 is triggered, diode 136 is rendered non-conductive. Thus, current no longer flows therethrough and, instead, capacitor 138 now is charged. At the conclusion of the timing signal, diode 136 once again is rendered conductive and capacitor 138 rapidly discharges therethrough. This discharge of the capacitor applies a negative pulse to output terminal 84, thereby actuating motor drive circuit 24 (FIG. 2A).

When motor drive circuit 24 is actuated, motor 12 is energized to advance tape T-1. At this time, it is appreciated that line seize relay 34 is de-energized, and telephone line 10 is not seized. This is because when the start-of-message indication had been sensed by start-of-tape sensor 74, voice discriminator 46 had been activated to de-energize the line seize relay.

Therefore, although the prerecorded announcement message is played back while tape T-1 is driven, this message is not applied to buss 13.

When the prerecorded marker signal on tape T-1 is reproduced by head 16 and detected by detector 38, switching circuit 42 is energized. However, since line seize relay 34 is not energized, an inhibit signal is applied therefrom via conductor 34c so as to inhibit the actuation of motor drive circuit 44 (FIG. 2B). Thus, even though switching circuit 42 is energized, tape T-2 is not driven. Nevertheless, motor drive circuit 24 is deactuated, as discussed above.

The pulse signal produced by marker detector 38 also is applied to input terminal 166 (FIG. 3A) as shown. Since line seize relay 34 is not energized at this time, the emitter electrode of transistor 194 is biased with a relatively lower voltage, such that the pulse signal applied to input terminal 166 renders this transistor conductive. Accordingly, capacitor 196 is discharged through the conducting transistor. At the conclusion of the pulse signal produced by detector 38, transistor 194 is rendered nonconductive and capacitor 196 is charged rapidly to supply a positive pulse through diode 198 to NAND gate 110. Since the repeat latch had been actuated, diode 131, coupled between inverter 130 and capacitor 196, is reverse biased and, thus, does not affect the positive pulse which is produced by the capacitor. Accordingly, NAND gate 110, which had been conditioned by the binary "1" applied thereto by timing circuit 114, is actuated to trigger timing circuit 120, thereby inhibiting motor drive circuit 24 for a given duration and thereafter energizing ring detector 32 and line seize relay 34. Thus, tape T-1 is driven, and the prerecorded remote telephone number information is played back therefrom to be transmitted over the seized telephone line.

The foregoing repeat operation is repeated whenever tape T-1 returns to its start-of-message position unless counter 142 attains its selected count or the message recorded on tape T-2 is retrieved. If counter 142 reaches its selected count, a binary "1" is applied via diode 144 to inverter 130, thereby deactuating the repeat latch. It is appreciated that a negative pulse is not applied to output terminal 84 for actuating motor drive circuit 24 in the event that the repeat latch is deactuated. Hence, when counter 142 attains its selected count, tape T-1 remains in ready position to respond to the next incoming telephone call. The repeat latch also is deactuated in the event that a message recorded on tape T-2 is retrieved. It is recalled that, during a message retrieval operation, switching circuit 68 is energized. At that time, a binary "0" is applied to input terminal 128, thereby deactuating the repeat latch.

In the foregoing description, it had been assumed that the predetermined (*) tone had been detected by tone detector 124 to actuate the repeat latch in response to the transmission of this tone from the calling party over telephone line 10. Alternatively, the telephone answering apparatus can be selectively programmed to perform this repeat operation. With reference to FIG. 4, announcement message tape T-1 may be recorded in the illustrated format wherein a start-of-message indication is followed by the announcement message which, in turn, is followed by the marker signal, assuming that tape T-1 is driven in the direction A (so as to be scanned in the direction B). A blank interval of predetermined duration follows the marker signals, and then the remote telephone number information, in the form of Touch-Tone signals, is recorded. The aforementioned page message then is recorded on the remaining portion of tape T-1. If a repeat operation is desired, the predetermined (*) tone may be recorded at any desired location, such as following the remote telephone number information. This signal is represented in FIG. 4 as the "repeat tone." It is appreciated that this repeat tone is applied to buss 13 when tape T-1 is driven after the ENERGIZE signal is produced at output terminal 92 (FIG. 3B) to energize ring detector circuit 32 and line seize relay 34, following the completion of an incoming telephone call, as described above. Hence, when this repeat tone is applied to buss 13, tone detector 124 is energized to actuate the repeat latch.

Therefore, it is seen that the repeat latch is actuated so as to initiate a repeat operation either in response to a predetermined tone transmitted to the telephone answering apparatus by a calling party or in response to the playing back of this tone from the prerecorded message tape T-1. Of course, the number of repeated outgoing telephone calls which are initiated is determined by suitably selecting the count to which counter 142 will be incremented. Hence, if the user is unable to retrieve an incoming message, only a selected number of repeated outgoing telephone calls will be initiated. Such outgoing telephone calls will not be made indefinitely.

AUTOMATED PAGING SERVICE

As mentioned above, one advantageous feature of the present invention is that if the user of the telephone answering apparatus also subscribes to an automatic radio paging service, the radio paging installation can be called and advised to page the user, thereby apprising him that an incoming message had been recorded on tape T-2 and is awaiting retrieval. In general, such automatic paging services require confirmation, upon receiving a telephone call, of the identity of the service subscriber. In a typical radio paging operation, a predetermined tone signal is transmitted from the paging installation to the calling party which must be followed by a coded signal representing the page subscriber's identity. A radio page will not be transmitted unless this identity-code signal is received.

In accordance with the foregoing general requirements, it is appreciated that the announcement message tape T-1, shown diagrammatically in FIG. 4, can be recorded with the appropriate information, such as the remote telephone number of the paging service installation and the page identity-code signal, so as to be compatible with the typical radio paging service. Accordingly, tape T-1 can be recorded in the format shown in FIG. 5. Hence, a start-of-message indication is provided, followed by the announcement message and then the marker signal, as before. A blank interval of sufficient duration follows the marker signal, and then the remote telephone number of the paging service installation is recorded. A pause tone signal follows the remote telephone number information, and functions to suspend further operation of the telephone answering apparatus until the paging service code signal is received.

A subscriber identity-code signal, such as predetermined subscriber identifying tone signals, is recorded following the pause tone, and then a repeated page message may be recorded, if desired. If the aforedescribed repeat operation is preferred, the repeat tone may be recorded at any location, such as following the subscriber identifying code signal.

The paging service control circuitry which operates in response to the recording format of tape T-1 shown in FIG. 5, is shown in FIG. 3B as comprising a switching transistor 168, NAND gate 172, timing circuit 180, tone detector 182 and NAND gate 184. The base of switching transistor 168 is coupled to input terminal 166 so as to receive the pulse signal generated by detector 38 (FIG. 2A) when head 16 reproduces the marker signal from tape T-1. The collector electrode of transistor 168 is coupled through a current limiting resistor 175 to timing circuit 180 via an inverter 176 and a capacitor 178 connected in series. The junction between resistor 175 and inverter 176 also is coupled through a negative poled diode to an output terminal 86. As shown in FIGS. 2A and 2B, terminal 86 is coupled to switching circuit 42 and functions to de-energize this switching circuit by applying a relatively low voltage thereto, thereby inhibiting motor drive circuit 44 from energizing motor 18. The junction defined by resistor 175 and inverter 176 also is coupled to the output of NAND gate 172 by a positively poled diode 174, NAND gate 172 having one input coupled to the output of NAND gate 102 and another input coupled to input terminal 106.

Timing circuit 180 has a predetermined time constant and, when triggered, functions to produce an inhibit pulse of corresponding time duration, this inhibit pulse being applied to output terminal 82. It is recalled that a pulse applied to this output terminal functions to inhibit, or deactuate, motor drive circuit 24. The output of timing circuit 180 also is coupled to one input of NAND gate 184, the other input of this NAND gate being coupled to the output of tone detector 182. Tone detector 182 is coupled to buss 13 and is adapted to detect a predetermined tone signal which will be transmitted from the radio paging installation in response to a telephone call received thereat, this tone serving to identify the radio paging service and requiring that the subscriber identifying-code signal be transmitted in response thereto. The output of NAND gate 184 applies a reset signal to timing circuit 180 to restore this timing circuit to its initial, standby condition.

In operation, let it be assumed that the telephone answering apparatus receives an incoming telephone call such that the prerecorded announcement message is transmitted, followed by transmission of the marker signal, and then an incoming message is recorded on tape T-2, as described above. It is recalled that, upon completion of this telephone call, telephone line 10 is released and then is re-seized, and motor 12 is energized to continue driving announcement message tape T1. Accordingly, the remote telephone number information is played back from tape T-1 and is transmitted over seized telephone line 10 so as to call the radio paging installation. After this remote telephone number information is played back, the pause tone is reproduced. In one embodiment, this pause tone is identical to the aforedescribed marker signal, which is detected by detector 38.

Since telephone line 10 had been released following the completion of the incoming telephone call, the incoming call latch circuit is deactuated. Hence, NAND gate 102 supplies a binary "1" to NAND gate 172. When telephone line 10 had been re-seized during the remote calling operation, a binary "1" had been applied to input terminal 106, thereby actuating NAND gate 172. Hence, a binary "1" no longer is supplied by diode 174 to resistor 175. Thus, when transistor 168 is rendered conductive in response to the pulse generated by detector 38, a relatively low voltage is provided at its collector electrode, thereby forward biasing diode 170. Hence, a correspondingly low voltage is supplied through output terminal 86 to prevent switching circuit 42 from being energized in response to the marker signal detected by detector 38. Thus, tape T-2 is not driven.

At the conclusion of the pulse generated by detector 38, transistor 168 is rendered nonconductive. Hence, a positive transition is provided at its collector electrode, this positive transition being inverted by inverter 176 and supplied as a negative pulse to trigger timing circuit 180. Consequently, an inhibit pulse is applied from timing circuit 180 through output terminal 82 to motor drive circuit 24, thereby inhibiting further movement of tape T-1. If, during this inhibit period, the outgoing telephone call to the paging service installation is completed, that installation will transmit a predetermined tone over telephone line 10. This tone is applied to buss 13 and is detected by tone detector 182, thereby applying a binary "1" to NAND gate 184. It is appreciated that this NAND gate now is actuated to reset timer 180. Consequently, the inhibit signal which had been applied to motor drive circuit 24 is terminated and the motor drive circuit now is actuated so as to energize motor 12 and drive tape T-1. Therefore, head 14 reproduces the subscriber identity code signal from tape T-1 and transmits this signal through record/playback circuit 26, buss 13, transformer 11 and telephone line 10 to the radio paging installation. The user of the telephone answering apparatus thus is apprised, via a radio page, that a message had been recorded on tape T-2 and is awaiting retrieval. When tape T-1 is recycled to return to start-of-message position, start-of-tape sensor 74 activates voice discriminator 46, whereupon telephone line 10 is released. Hence, the user now can complete a telephone call to his telephone answering apparatus and retrieve the message which had been recorded on tape T-2.

As described above, if a repeat tone signal had been recorded on tape T-1, a repeat operation will be performed in the event that the user does not retrieve the incoming message which had been recorded. Thus, the radio paging installation will be called a predetermined number of times, depending upon the selected count of counter 142, or until the user retrieves the recorded message. It is appreciated that the repeat circuit functions in the manner described above, regardless of whether the remote telephone number which is dialed corresponds to a radio paging installation or to any other remote telephone station.

REPROGRAMMING THE ANNOUNCEMENT MESSAGE TAPE

As mentioned above, yet another advantageous feature of the present invention is the ability to reprogram the information recorded on tape T-1 from any remote telephone station. For example, if the user changes his location from one telephone station to another, the remote telephone number information recorded on tape T-1 (FIGS. 4 and 5) can be revised accordingly. As another example, the recording format of tape T-1 can be changed from that shown in FIG. 4 to that shown in FIG. 5, or vice versa. This remote recording capability is controlling by the record control circuit shown in FIG. 3A.

The record control circuit is comprised of a timing circuit 148, a switching transistor 152, a tone detector 154, a latch circuit 162, a switching transistor 156 and a pulse generator 164. Timing circuit 148 has its input coupled to an input terminal 146 and is adapted to receive a tone detect signal from tone detector 54 (FIG. 2B) for generating a timing pulse of predetermined duration in response thereto. The output of timing circuit 148 is coupled through a diode 150 to the collector electrode of switching transistor 152 and, additionally, to the input of latch circuit 162. Latch circuit 162 may be similar to the aforedescribed incoming call latch circuit and to the repeat latch circuit and is adapted to maintain its actuated condition in response to the timing pulse applied thereto so as to produce a binary "1".

Switching transistor 152, which preferably is an NPN transistor, has its base electrode coupled to the output of marker tone detector 154. This tone detector may be similar to detector 38 and includes an input coupled to input terminal 122, the latter being connected to buss 13. Marker tone detector 154 is of the type which normally produces a binary "1" but generates a negative pulse, corresponding to a binary "0" for a given duration upon sensing a marker tone signal of predetermined frequency. The base electrode of transistor 152 also is coupled to input terminal 116 via an inverter 153 for a purpose soon to be described.

The collector electrode of transistor 152 is coupled through a negatively poled diode 155 to the base electrode of switching transistor 156. Preferably, transistor 156 is a PNP transistor whose emitter electrode is coupled to the output of latch circuit 162 and, additionally, through a positively poled diode 158 to an output terminal 90. The collector electrode of this transistor is coupled through a positively poled diode 160 to another output terminal 90. Output terminals 90 supply a record signal to record/playback circuit 26 (FIG. 2A) such that when a relatively positive voltage level is provided at these output terminals, record/playback circuit 26 is actuated to its record mode analogous to that when microphone 28 is operably connected thereto.

The output of latch circuit 162 also is coupled to an output terminal 88 for producing an INHIBIT signal. This latch circuit further is coupled to pulse generator 164 which is a negative-edge triggered pulse generator the output of which is coupled to output terminal 92 for producing the aforedescribed ENERGIZE signal thereat and also is coupled to an input of NAND gate 102 in order to actuate the incoming call latch circuit.

The manner in which the remote record control circuit operates now will be described. Let it be assumed that, after recording an incoming message, the telephone answering apparatus operates in its remote calling mode so as to initiate a telephone call to the predetermined remote telephone station at which the user is located. Accordingly, the incoming call latch circuit is not actuated. Let it be further assumed that the user retrieves the message which had been recorded on the tape T-2 and now wishes to revise some or all of the information which is recorded on tape T-1. Let it be additionally assumed that when the user energized switching circuit 42 in response to the actuation of tone generator 6 in order to retrieve the recorded message, tape T-1, which had been stopped at that time, had not been completely recycled. Thus, a portion of the page message recorded on tape T-1 (FIG. 4) is juxtaposed head 14.

In order to initiate a remote recording operation, timing circuit 148 must be actuated. This is achieved if the user actuates tone generator 6 at any time while in communication with the illustrated telephone answering apparatus. When this predetermined tone signal is applied to buss 13, tone detector 54 produces the tone detect signal to actuate timer 148. Alternatively, since this tone signal is recorded on tape T-2 when a message retrieval operation is initiated, tone detect circuit 54 may produce the tone detect signal in response to the playing back of this previously recorded tone signal during the final portion of the message retrieval operation. In either event, timing circuit 148 is actuated to produce the illustrated timing pulse of predetermined duration.

The output of marker tone detector 154 (FIG. 3A) normally is at a relatively higher voltage level. Hence, transistor 152 normally is rendered conductive, thereby providing a low impedance path through diode 150. Hence, whenever timing circuit 148 is actuated, the low impedance path provided by diode 150 and the collector-emitter circuit of normally conductive transistor 152 substantially attenuates the timing pulse, thereby preventing latch circuit 162 from being actuated. However, if, after providing the predetermined tone signal on buss 13, the user energizes a predetermined Touch-Tone switch, or appropriately energizes a suitable tone generator on tone pad 7, this particular tone is transmitted through telephone line 10 and transformer 11 to buss 13. Accordingly, this tone is supplied to marker tone detector 154 whereat it is detected, thereby providing a pulse of relatively low voltage level to transistor 152. The transistor responds to this lower voltage level and is rendered nonconductive, thereby interrupting the low impedance path coupled to the input of latch circuit 162. Transistor 152 thus is seen to function as a coincidence circuit for sensing the coincidence of the predetermined tone and the marker tone to actuate the latch circuit to provide a substantially constant voltage level at its output. This voltage level is supplied to output terminal 88 as the INHIBIT signal which, in turn, is applied to motor drive circuit 44 and to voice discriminator 46. Accordingly, even if switching circuit 42 is energized during the remote recording operation, motor drive circuit 44 is deactuated to inhibit the energization of motor 18. Furthermore, voice discriminator 46 is inhibited to avoid the inadvertent de-energization of line seize relay 34 during this remote recording operation.

The voltage level provided at the output of latch circuit 162 is applied to the emitter electrode of transistor 156 and, through diode 158, to an output terminal 90. Upon the termination of the negative pulse at the output of marker tone detector 154, transistor 152 once again is rendered conductive. Although the input to latch circuit 162 now is shunted through a low impedance path, it is appreciated that this has no effect upon the output voltage produced by this circuit. However, when transistor 152 is rendered conductive, base current flows through transistor 156, thereby rendering this transistor conductive. Hence, the relatively higher voltage level applied to the emitter electrode thereof now is supplied to the collector electrode and, through diode 160, to the other output terminal 90. By providing this relatively higher voltage level at both output terminals 90, the RECORD signal is applied to record/-playback circuit 26, thereby energizing this circuit to its record mode, whereupon motor drive circuit 24 is actuated and audio signals that may be coupled from buss 13 to the record/playback circuit are recorded on tape T-1. Thus, voice signals can be recorded by the user from the remote telephone station onto the remaining portion of tape T-1 until the start-of-message indication is reached.

As shown, latch circuit 162 includes a reset input coupled to input terminal 132. Hence, when the start-of-message indication is detected by start-of-tape sensor 74 (FIG. 2A), a reset signal is applied to input terminal 132 so as to reset latch circuit 162. When the latch circuit is reset, the INHIBIT signal applied to output terminal 88, and thence to motor drive circuit 44 and to voice discriminator 46 is terminated. Also, transistor 156 is rendered nonconductive so as to remove the RECORD signal from record/playback circuit 26. Thus, the remote recording operation is terminated. In order to change the announcement message, remote telephone number information and page message, the user must reinitiate the remote recording operation. This is, the predetermined tone signal must be applied again to buss 13 so that tone detector 54 will supply a tone detect signal to timing circuit 148 so as to actuate this timing circuit. Then, the user must transmit the marker tone to the telephone answering apparatus so as to be detected by marker tone detector 154, thereby enabling latch circuit 162 to be acuated. When these functions have been performed, the RECORD signal is applied to record/playback circuit 26, as before, and tape T-1 is driven. Hence, the user now can record a new announcement message. Following this announcement message, a marker signal can be transmitted and recorded. While this marker signal may have the same frequency as that of the signal which is detected by marker tone detector 154, this marker signal merely will interrupt the conductivity of transistor 152 so as to correspondingly interrupt the RECORD signal. However, upon the termination of the marker signal, transistor 152 once again is rendered conductive. Nevertheless, a sufficient portion of the marker signal will be recorded on tape T-1.

Following the recording of this marker signal, a brief blank interval may be provided and then the remote telephone number information can be transmitted so as to be recorded on tape T-1. It is recalled that this telephone number information is in the form of Touch-Tone signals which may be generated either by energizing selected switches of the Touch-Tone dialing switches included on the telephone instrument operated by the user or by suitably energizing selected switches on Touch-Tone pad 7. Tape T-1 will continue to be driven and the user then may record a page message, if desired. If the telephone answering apparatus is to be conditioned for a repeat dialing operation, the predetermined (*) repeat tone signal may be transmitted by the user at any time during his page message.

When tape T-1 finally is recycled so as to return to its start-of-message position, a reset signal indicative thereof is applied to input terminal 132 to reset latch circuit 162. Hence, the remote recording operation is terminated, and pulse generator 164 is triggered. The pulse generator applies a positive pulse to NAND gate 102 which, having been conditioned by line seize relay 34, is actuated. The generated pulse also is applied as the ENERGIZE signal via output terminal 92 to ring detect circuit 32. Therefore, upon the completion of the remote recording operation, the incoming call latch circuit and ring detect circuit 32 are actuated as if an incoming telephone call had been received. Thus, the user at the remote station can listen to the announcement message which he just recorded as this message is played back by head 14 and record/playback circuit 26. During this message playback, when the recorded marker signal is reproduced, switching circuit 42 is energized to deactuate motor drive circuit 24 and to acutate motor drive circuit 44, as described above. Hence, if desired, the user may record a message on tape T-2 indicating that he has changed the information recorded on tape T-1.

It may be appreciated that the aforedescribed remote recording operation can be performed by the user in the event that he initiates an incoming telephone call to the telephone answering apparatus. Such an incoming telephone call will be detected in the normal manner described above. If the user immediately actuates tone generator 6 so as to transmit the predetermined tone over telephone line 10, then, when the telephone line is seized, this tone will be detected by tone detector 54 so as to energize switching circuit 42, thereby deactuating motor drive circuit 24 and actuating motor drive circuit 44. Hence, even though ring detect circuit 32 is energized, motor 12 is not energized. Then, if the user transmit the marker tone during the duration of the timing signal produced by timing circuit 148, transistor 152 is rendered nonconductive and latch circuit 162 is actuated, as described above. The remote recording operation then may proceed in the aforedescribed manner.

Inverter 153 is provided to prevent the inadvertent actuation of latch circuit 162 during an incoming message recording operation or during a message retrieval operation. It is appreciated that, during such operations, tone detector 54 may responsd to the predetermined tone signal to produce the tone detect signal at various times. Hence, timing circuit 148 correspondingly is actuated at such times. However, during message recording and message retrieval operations, motor drive circuit 44 is actuated. This, in turn, applies a relatively low voltage level to input terminal 116 which, after being inverted by inverter 153, renders transistor 152 conductive. Hence, although timing circuit 148 is actuated at various times during these operations, then, even if the marker tone is applied to buss 13, the timing pulse generated by circuit 148 is shunted through diode 150 and conducting transistor 152, and thus is unable to actuate latch circuit 162.

The apparatus illustrated in FIGS. 3A and 3B include various circuits to prevent certain functions from being performed at undesired times. For example, the marker signal which is recorded on tape T-1 may be adapted to control various functions, including energizing switching circuit 42 when an incoming telephone call is received as well as actuating timing circuit 180 included in the paging service control circuit when an outgoing telephone call is initiated to a radio paging installation. NAND gate 172 prevents timing circuit 180 from being actuated in response to the marker signal when an incoming telephone call has been received. Hence, when NAND gate 102 is actuated in response to an incoming telephone call, NAND gate 172 applies a binary "1" through diode 174 to inverter 176. Hence, even if transistor 168 is rendered conductive in response to the detection of the marker signal immediately following the announcement message of tape T-1, the voltage across resistor 175 still is sufficient to apply a binary "1" to the inverter. Also, in the event that a marker signal is detected when the telephone line is not seized, as when tape T-1 is recorded in the format shown in FIGS. 4 or 5, and is recycling during a repeat operation or is recycling to its start-of-message position (as when an incoming telephone call is of less than the predetermined duration), NAND gate 172 maintains a binary "1" at the input of inverter 176 even if transistor 168 is rendered conductive.

In a similar manner, diode 131 functions to prevent timing circuit 1200 from being triggered in response to a marker signal detected by detector 38 when the telephone line is not seized and tape T-1 is recycling, in the event that the repeat latch is not actuated. If the repeat latch is not actuated, diode 131 is forward biased such that even if transistor 94 is rendered conductive in response to a detected marker signal, a positive pulse will not be transmitted through capacitor 196 and diode 198 to NAND gate 110. This prevents the ENERGIZE signal from being produced inadvertently and energizing ring detect circuit 32 while tape T-1 merely is recycling.

While the present invention has been particularly shown and described with reference to a preferred embodiment thereof, it should be readily apparent to those of ordinary skill in the art that various changes and modifications in form and details may be made without departing from the spirit and scope of the invention. For example, in the preferred embodiment, three distinct tone signals are used to control and initiate various functions. If desired, respective tone signals can be provided for each particular function. Alternatively, rather than utilizing tone signals, other code signals such as pulse code signals, can be used. As another example, the start-of-message indication on tape T-1 may comprise a fixed marker, such as a conductive element, a light-reflective or-transmissive member, or the like. As an alternative, the start-of-message indication may comprise a predetermined magnetic signal. In this regard, the aforedescribed remote record control circuit is deactivated once tape T-1 has been recycled to its start-of-message position. However, if the start-of-message indication is a magnetic signal, then remote recording can begin at virtually any location along tape T-1 and continue until the tape has been recycled back to that location.

As yet another example, although magnetic tapes have been described as comprising the storage medium upon which prerecorded messages are stored and upon which incoming messages are stored, it should be appreciated that various alternative storage media can be used, if desired. For example, such storage media may be formed of magnetic sheets. Alternatively, solid-state storage devices can be used, such a recently developed bubble memories, charge-coupled devices, and the like.

As a still further example, the above-described telephone answering apparatus has been assumed to be coupled to a telephone line 10. However, various alternative telecommunication channels can be provided, if desired, such as a radio link, or the like.

In addition, in describing the call control circuit of FIG. 3A, it has been assumed that an outgoing telephone call is initiated if an incoming message is greater than a predetermined duration. Alternatively, if the timing constant of timing circuit 114 is established to be unusually long, the outgoing telephone call may not be initiated following normal incoming messages. However, if the calling party is instructed to transmit the repeat (*) tone, the repeat control circuit will be suitably actuated to initiate such an outgoing telephone call operation.

As a further modification, the remote telephone number information which is recorded on tape T-1 (FIG. 4) may be associated with a time-of-day recording that is provided by many telephone operating companies. Thus, after each incoming message is recorded, this telephone number will be dialed so as to record the time-of-day that such incoming message is received. If desired, further remote telephone number information may also be recorded on tape T-1 so that the remote station at which the user is located will be called, thereby apprising him that a message has been received and is awaiting retrieval.

It also should be understood that the various functions and operations performed by the circuits shown and described herein can be performed by equivalent circuits. Thus, various alternative switching devices, such as logic switching circuits, can be substituted for the transistors illustrated herein, as well as for other switching circuit which have been described.

In yet another embodiment, a plurality of remote telephone numbers may be recorded on tape T-1, successive telephone numbers being separated by start-of-message indications of the aforedescribed type. Also, paging messages may be recorded following each remote telephone number. As examples, the first telephone number may be the user's home location, the second telephone number may be the user's expected location, the third telephone number may be the user's paging service, etc. Then, if the aforedescribed repeat latch is actuated, the first telephone number will be called following an incoming telephone call. If this called number is not answered, or if the recorded message is not retrieved, tape T-1 will be advanced and the next telephone number will be called. This operation can continue to enable the apparatus to call each of the programmed telephone numbers, with each detected start-of-message indication incrementing counter 142.

In a further embodiment, the aforedescribed telephone answering apparatus is adapted to perform an alarm announcement operation. A separate track of tape T-1 may be provided with an emergency remote telephone number, such as that of particular emergency or assistance agencies (e.g., fire, police, etc.) followed by a pre-recorded emergency announcement. In the event of an emergency condition, this separate track is accessed, for example, by conventional head indexing mechanisms, and the detected emergency condition produces an ENERGIZE signal, similar to that produced at output terminal 92 (FIG. 3B). Hence, the emergency remote telephone number is called and the emergency announcement is transmitted. A repeat operation, similar to that described hereinabove, can be carried out for the purpose of repeatedly performing this "alarm" operation.

It is, therefore, intended that the appended claims be interpreted as including the foregoing as well as all other such changes and modifications.

What is claimed is:

1. Telephone answering apparatus adapted to be coupled to a telephone communication channel, and comprising:

a first record medium having an announcement message recorded thereon, followed by telephone number information representing a predetermined telephone number, followed by a page message;

first transducer means associated with said first record medium for reproducing said announcement message, said telephone number information and said page message;

first drive means selectively energizable to drive said first record medium relative to said first transducer means;

a second record medium for storing incoming messages received from said telephone communication channel;

second transducer means associated with said second recording medium and selectively operative to record said incoming messages thereon and to reproduce recorded messages therefrom;

second drive means selectively energizable to drive said second record medium bidirectionally relative to said second transducer means;

line seizing means actuable in response to an incoming telephone call for seizing said telephone communication channel to operably connect said telephone answering apparatus thereto and for initiating a telephone answering cycle whereby said first drive means is energized for an announce period such that said announcement message is reproduced and transmitted over said telephone communication channel and then said second drive means is energized to enable an incoming message to be recorded on said second record medium;

means for sensing the termination of said incoming telephone call to de-energize said second drive means and de-actuate said line seizing means;

timing means responsive to the energizing of said second drive means for timing the duration of the incoming message of said incoming telephone call said timing means being de-energized in response to the de-actuation of said line seizing means if said duration is less than a predetermined time and being energized to provide an energize signal if said duration exceeds said predetermined time;

means for applying said energize signal to said line seizing means to re-seize said telephone communication channel and to re-energize said first drive means such that said telephone number information and said page message are reproduced and transmitted over said telephone communication channel;

code detecting means for detecting a first coded signal transmitted over said seized telephone communication channel to said telephone answering apparatus for energizing said second drive means to drive said second record medium such that said recorded incoming messages are reproduced therefrom; and programmable repeat means selectively operable to re-energize said first drive means and to re-actuate said line seizing means for re-connecting said telephone answering apparatus to said telephone communication channel to transmit said telephone number information and said page message over said telephone communication channel, said repeat means operating either a number of times, preselected as desired, following the completion of an incoming telephone call or until said second drive means is energized, prior to said preselected number of operations, for recording or reproducing incoming messages on said second record medium.

2. The apparatus of claim 1, further comprising reset means responsive to the completion of the reproduction of said recorded incoming messages from said record medium following the detection of said first coded signal for energizing said first drive means to drive said first record medium relative to said first transducer means to a predetermined start position and for de-actuating said line seizing means so as to reset said telephone answering apparatus to a condition for responding to a subsequent incoming telephone call.

3. The apparatus of claim 1 wherein said first record medium also stores a repeat control signal; and wherein said repeat means includes detecting means for detecting a repeat code control signal either reproduced from said first record medium by said first transducer means or transmitted to said telephone answering apparatus over said telephone communication channel to initiate the operation of said repeat means following the completion of said incoming telephone call.

4. The apparatus of claim 3 wherein said repeat means further comprises counting means whose count is incremented in response to each transmission of telephone number information from said first record medium; and inhibit means for inhibiting further energization of said first drive and actuation of said line seizing means by said repeat means when a selected count of said counting means is reached.

5. The apparatus of claim 4 wherein said repeat means further includes delay means for providing a predetermined delay between successive energizations of said first drive means by said repeat means.

6. The apparatus of claim 1 wherein said first record medium comprises a first magnetic tape; and wherein said second record medium comprises a second magnetice tape.

7. The apparatus of claim 6 wherein said first magnetic tape is endless and has recorded thereon, in order, an announcement message, an end of announcement signal, a telephone number code, a page message and a repeat code control signal; and further comprising switch means responsive to the reproduction by said first transducer means of said end of announcement signal for de-energizing said first drive means and energizing said second drive means.

8. The apparatus of claim 7 wherein said timing means comprises means for sensing when said line seizing means releases said telephone communication channel following the termination of said incoming call; means to determine if said telephone communication channel is released during or following said predetermined time; and means for producing said energize signal after a predetermined delay if said telephone communication channel is released following said predetermined time.

9. The apparatus of claim 7 wherein said code detecting means is coupled to said telephone communication channel and is responsive to said first coded signal regardless of whether said first coded signal is transmitted while said first drive means or said second drive means is energized; and wherein said second drive means comprises selectively energizable rewind means coupled to said code detecting means to be energized when said first coded signal is detected to rewind said second tape a selected amount; and wherein said second transducer means includes playback means for playing back messages which had been recorded on the amount of said second tape which had been rewound.

10. The apparatus of claim 9 wherein said repeat means comprises repeat code detecting means connected to selectively detect said repeat code control signal when said repeat code control signal is reproduced by said first transducer means or when said repeat code control signal is transmitted to said telephone answering apparatus via said telephone communication channel; latching means energized to produce a latch signal in response to said detected repeat code control signal; means for sensing when said first drive means has driven said first tape to return to the beginning of said announcement message; and means responsive to said latch signal at a predetermined time following the sensing of the return of said first tape to said beginning of said announcement message to energize said first drive means.

11. The apparatus of claim 10 wherein said means for providing an energizing signal comprises gate means selectively energized by said termination of said incoming call having a duration that exceeds said predetermined time or by the end of announcement signal reproduced by said transducer means when said first drive means energized by said repeat means following said sensing of the return of said first tape to said beginning of said announcement message.

12. Telephone answering apparatus adapted to be coupled to a telephone communication channel and being of the type that responds to an incoming telephone call to transmit announcement information and then to receive and store an incoming message, said apparatus comprising:

a first magnetic tape having recorded thereon, in order, an announcement message, an end of announcement signal, a telephone number code and a page message;

first drive means for driving said first magnetic tape in an endless loop;

a first transducer for recording signals on and reproducing signals from said first magnetic tape;

a second magnetic tape for recording incoming messages received via said telephone communication channel;

second drive means for driving said second magnetic tape;

a second transducer for recording said incoming messages on said second magnetic tape;

incoming call detecting means for detecting an incoming telephone call to seize said telephone communication channel and to energize said first tape drive means to drive said first tape past said first transducer whereby said announcement message is played back;

end of announcement signal detecting means for detecting when said end of announcement signal is played back to de-energize said first tape drive means and to energize said second tape drive means so as to drive said second tape past said second transducer whereby an incoming message is recorded on said second tape;

end of call detecting means for detecting the completion of an incoming telephone call;

means for releasing said telephone communication channel in response to the detection of said completion of said incoming telephone call;

calling means responsive to the detected completion of selected incoming telephone calls for re-seizing said telephone communication channel and for playing back said telephone number code from said first magnetic tape representing a remote telephone number so as to dial said remote telephone number, said calling means including delay means for delaying the seizing of said telephone communication channel for a predetermined time following the completion of said incoming telephone call, and means for energizing said first tape drive means when said telephone communication channel is re-seized; and information storage control means for replacing at least a portion of the information recorded on said first magnetic tape with revised information received via said telephone communication channel, said information storage control means including:

coded signal detecting meand selectively coupled to said telephone communication channel for detecting predetermined coded signals whether said coded signals are transmitted to said telephone answering apparatus from a remote telephone station which had been dialed by said calling means or as part of an incoming telephone call for inhibiting said second magnetic tape from recording information received via said telephone communication channel; and enabling means responsive to the detection of said predetermined coded signals for enabling said first magnetic tape to record information received via said telephone communication channel so as to change the information which previously had been recorded thereon.

13. The apparatus of claim 12 wherein said predetermined coded signals comprise tone signals and said coded signal detecting means comprises tone detecting means for detecting said tone signals.

14. The apparatus of claim 13 wherein said tone signals comprise first and second tone signals and said tone detecting means comprise first and second tone detectors; and wherein said telephone answering apparatus includes record/playback means coupled to said second transducer for recording incoming messages on said second tape when said second tape drive means is energized; rewind means selectively operable to energize said second tape drive means to rewind said second tape for causing said record/playback means to playback messages that had been recorded on said rewound tape; and means responsive to the detection of one of said tones by a corresponding one of said tone detectors to operate said rewind means and to condition said record/playback means for a playback operation.

15. The apparatus of claim 13 further comprising recorded means selectively coupled to said telephone communication channel and connected to said first transducer means, said recording means being actuated by said enabling means to energize said first tape drive means and to record information received via said telephone communication channel onto said tape.

16. The apparatus of claim 15 wherein said enabling means comprises record switch means energized by the detection of said tone signals for actuating said recording means.

17. The apparatus of claim 16 wherein said tone signals comprise first and second tone signals; said tone detecting means comprise first and second tone detectors for detecting said first and second tone signals, respectively; and said record switch means is conditioned by the detection of one of said tone signals so as to be energized in response to the other of said tone signals.

18. The apparatus of claim 17 wherein said record switch means comprises a latching circuit for producing a substantially constant latch signal; inhibit means coupled to said latching circuit for normally inhibiting said latching circuit from producing said latch signal; means for disabling said inhibit means when one of said tone signals is detected; means for triggering said latching circuit to produce said latch signal said other tone signal is detected, provided said inhibit means is disabled; and transistor means operated in response to the detection of one of said tone signals only if said latch signal is produced so as to actuate said recording means.

19. The apparatus of claim 18 further comprising means for operating said inhibit means to inhibit said latching circuit when said second tape drive means is energized, thereby to prevent the inadvertent actuation of said recording means in the event that said tone signals are transmitted during a received message.

20. The apparatus of claim 18 further comprising reset means for detecting when said first tape has been driven through a complete loop for resetting said latching circuit to terminate said latch signal and thereby deactuate said recording means.

21. Telephone answering apparatus adapted to be coupled to a telephone line and having a first cyclical magnetic tape upon which are recorded announcement information to be transmitted in reply to an incoming telephone call and additional information representing a remote telephone number and a page message, and a second magnetic tape for recording messages received from remote callers via said telephone line, said apparatus comprising:

line seizing means responsive to an incoming telephone call to seize said telephone line;

first tape drive means energized when said telephone line is seized to drive said first tape to play back said announcement information recorded thereon and to transmit same via said telephone line;

second tape drive means energized in response to the conclusion of said announcement information to de-energize said first tape drive means and to drive said second tape to record messages transmitted thereto over said telephone line;

line release means energized in response to the end of a transmitted message for releasing said telephone line;

calling means energized in response to the releasing of said telephone line for subsequently actuating said line seizing means and to energize said first tape drive means so as to drive said first tape to play back said additional information and said page message;

first code detecting means for detecting a first coded signal transmitted to said telephone answering apparatus via said telephone line to energize said second tape drive means and to deenergize said first tape drive means, said second tape drive means being energized by the detection of said first coded signal to rewind said second tape and to play back messages recorded thereon;

means for energizing said line release means in the event that said first tape is driven through a complete cycle;

repeat means selectively operable when said first tape is driven through a complete cycle for energizing said first tape drive means and thereby drive said first tape through said announcement information and then energize said calling means such that said additional information and said page message are transmitted again, said repeat means being operable a selected number of times;

means for resetting said repeat means to an initial condition when said second tape drive means is energized to rewind said second tape;

second code detecting means for detecting a second coded signal on said telephone line to de-energize said second tape drive means and to energize said first tape drive means; and recording means responsive to the detected second coded signal for recording information received via said telephone line on said first tape.

22. The apparatus of claim 21 wherein said repeat means comprises a tone detector coupled to said telephone line to receive a predetermined code transmitted to said telephone answering apparatus; repeat latching means responsive to the detection of said predetermined code for producing a latch signal; delay means for utilizing said latch signal to energize said first tape drive means at a predetermined time after said first tape is driven through a complete cycle; and counter means responsive to each utilization of said latch signal to energize said first tape drive means for incrementing the count thereof, said latch signal being inhibited when said counting means obtains a predetermined count.

23. The apparatus of claim 22 wherein said first tape has a tone signal recorded thereon following said announcement information; and said calling means includes a tone detector for detecting said tone signal reproduced from said first tape when said first tape drive means is energized by said repeat means to actuate said line seizing means.

24. The apparatus of claim 21 wherein said page message is adapted to be transmitted to an automatic paging installation associated with the remote telephone number represented by said additional information, said apparatus further comprising sensing means for sensing the completion of said additional information played back from said first tape and actuable to interrupt the energization of said first tape drive means for a period of time; and third code detecting means for detecting a third coded signal transmitted to said telephone answering apparatus from said paging installation during the period of interruption to deactuate said sensing means and thereby enable said first tape drive means to resume driving said first tape through a complete cycle.

25. The apparatus of claim 24 wherein said first tape has a predetermined tone signal recorded thereon following said additional information; and said sensing means comprises tone detecting means for detecting said tone signal, and timing means responsive to the detection of said tone signal for interrupting said energization of said first tape drive means for a predetermined time duration, said timing means being reset in response to the detection of said third coded signal, whereby said page message is transmitted.

26. The apparatus of claim 24 wherein said first coded signal is a first code tone and said first code detecting means is a first code tone detector; said second coded signal includes a second code tone; and said second code detecting means comprises timing means responsive to the detection of said first code tone for generating a timing signal of predetermined duration, latch means coupled to said timing means and responsive to said timing signal for generating a latch signal to de-energize said second tape drive means, inhibit means coupled to said latch means for normally inhibiting said latch means from responding to said timing signal, a second code tone detector responsive to said second code tone on said telephone line for disabling said inhibit means, whereby said latch means is enabled to generate said latch signal, and switch means responsive to said latch signal for energizing said first tape drive means.

27. The apparatus of claim 26 wherein said recording means comprises a recording circuit coupled to said first tape and actuated by said switch means for recording said received information onto said first tape.

28. The apparatus of claim 27 wherein said first code tone detector detects said first code tone whether said first code tone is transmitted to said telephone answering apparatus via said telephone line or said first code tone is a portion of a message played back from said second tape.

* * * * *

UNITED STATES PATENT AND TRADEMARK OFFICE
CERTIFICATE OF CORRECTION

PATENT NO. 4,188,507

DATED : February 12, 1980

INVENTOR(S) : Kalju Meri and Richard G. Allen

It is certified that error appears in the above-identified patent and that said Letters Patent are hereby corrected as shown below:

Column 33, Claim 12, line 17, change "meand" to -- means --

Column 34, Claim 18, line 10, first occurrence add -- when -- after "signal"

Signed and Sealed this

Third Day of June 1980

[SEAL]

Attest:

SIDNEY A. DIAMOND

Attesting Officer

Commissioner of Patents and Trademarks